(12) United States Patent
Kim et al.

(10) Patent No.: US 11,012,992 B2
(45) Date of Patent: May 18, 2021

(54) METHOD FOR TRANSMITTING AND RECEIVING DOWNLINK SIGNALS BETWEEN TERMINAL AND BASE STATION IN WIRELESS COMMUNICATION SYSTEM SUPPORTING UNLICENSED BAND, AND DEVICE SUPPORTING SAME

(71) Applicant: LG Electronics Inc., Seoul (KR)

(72) Inventors: Seonwook Kim, Seoul (KR); Changhwan Park, Seoul (KR); Joonkui Ahn, Seoul (KR); Suckchel Yang, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/877,725

(22) Filed: May 19, 2020

(65) Prior Publication Data
US 2020/0322932 A1    Oct. 8, 2020

Related U.S. Application Data

(63) Continuation of application No. PCT/KR2019/000751, filed on Jan. 18, 2019.
(Continued)

(30) Foreign Application Priority Data

Aug. 9, 2018    (KR) .................. 10-2018-0092781

(51) Int. Cl.
*H04W 72/04*    (2009.01)
*H04W 16/14*    (2009.01)

(52) U.S. Cl.
CPC ......... *H04W 72/042* (2013.01); *H04W 16/14* (2013.01)

(58) Field of Classification Search
None
See application file for complete search history.

(56) References Cited

U.S. PATENT DOCUMENTS

2017/0339704 A1    11/2017   Matsumoto et al.
2018/0139735 A1*    5/2018   Akkarakaran ........ H04L 5/0051
(Continued)

FOREIGN PATENT DOCUMENTS

KR    1020140052971    5/2014
WO    WO2013049768    4/2013
(Continued)

OTHER PUBLICATIONS

CATT, "PDSCH and PUSCH resource allocation," R1-1715824, 3GPP TSG RAN WG1 Meeting AH_#NR3, Nagoya, Japan, dated Sep. 18-21, 2017, 11 pages.
(Continued)

*Primary Examiner* — Anh Ngoc M Nguyen
(74) *Attorney, Agent, or Firm* — Fish & Richardson P.C.

(57) ABSTRACT

Disclosed are a method for transmitting and receiving downlink signals between a terminal and a base station in a wireless communication system supporting an unlicensed band, and a device supporting same. More specifically, as one applicable embodiment in the present disclosure, the terminal can control/change a monitoring period of a physical downlink control channel on the basis of whether a downlink signal transmission burst is transmitted from a base station, and in response thereto, the base station sets a transmission period of the physical downlink control channel in the downlink signal transmission burst so as to transmit the same to the terminal.

13 Claims, 22 Drawing Sheets

Related U.S. Application Data

(60) Provisional application No. 62/619,044, filed on Jan. 18, 2018.

(56) References Cited

U.S. PATENT DOCUMENTS

| | | | | |
|---|---|---|---|---|
| 2018/0143647 A1* | 5/2018 | Wang | ...................... | G01C 21/30 |
| 2018/0279303 A1* | 9/2018 | Sun | .................... | H04W 72/1278 |
| 2019/0150073 A1* | 5/2019 | Tiirola | .................. | H04W 72/10 |
| | | | | 455/434 |

FOREIGN PATENT DOCUMENTS

| WO | WO2016122786 | 8/2016 |
|---|---|---|
| WO | WO2017078411 | 5/2017 |

OTHER PUBLICATIONS

MediaTek Inc., "Discussion on group-common PDCCH," R1-1707825, 3GPP TSG RAN WG1 Meeting #89, Hangzhou, P.R. China, dated May 15-19, 2017, 7 pages.

PCT International Search Report in International Application No. PCT/KR2019/000751, dated May 8, 2019, 24 pages (with English translation).

Vivo, "Design of group-common PDCCH," R1-1717485, 3GPP TSG RAN WG1 NR Meeting 90bis, Prague, CZ, dated Oct. 9-13, 2017, 10 pages.

LG Electronics, "Discussion on the structure of group common PDCCH," R1-1713170, 3GPP TSG RAN WG1 Meeting #90, Prague, Czech Republic, dated Aug. 21-25, 2017, 3 pages.

LG Electronics, "Discussion on group common PDCCH," R1-1717953, 3GPP TSG RAN WG1 #90bis, Praha, Czech Republic, dated Oct. 9-13, 2017, 11 pages.

* cited by examiner

Carrier aggregation between L-band and U-band

Standalone U-band(s)

METHOD FOR TRANSMITTING AND RECEIVING DOWNLINK SIGNALS BETWEEN TERMINAL AND BASE STATION IN WIRELESS COMMUNICATION SYSTEM SUPPORTING UNLICENSED BAND, AND DEVICE SUPPORTING SAME

CROSS-REFERENCE TO RELATED APPLICATIONS

This application is a continuation of International Application No. PCT/KR2019/000751, filed on Jan. 18, 2019, which claims the benefit of Korean Application No. 10-2018-0092781, filed on Aug. 9, 2018, and U.S. Provisional Application No. 62/619,044, filed on Jan. 18, 2018. The disclosures of the prior applications are incorporated by reference in their entirety.

TECHNICAL FIELD

The present disclosure relates to a wireless communication system, and more particularly, to a method of transmitting and receiving a downlink signal between a terminal and a base station in a wireless communication system supporting an unlicensed band and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

SUMMARY

An aspect of the present disclosure devised to solve the conventional problem is to provide a method and apparatus for transmitting and receiving a downlink signal between a terminal and a base station (BS) in a wireless communication system supporting an unlicensed band.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method of transmitting and receiving a downlink signal between a user equipment and a base station in a wireless communication system supporting an unlicensed band and devices for supporting the same.

In an aspect of the present disclosure, provided is a method of receiving a downlink signal by a user equipment (UE) from a base station (BS) in a wireless communication system supporting an unlicensed band. The method may include: receiving the downlink signal by performing first physical downlink control channel (PDCCH) monitoring at a first periodicity in the unlicensed band; receiving an initial signal indicating the presence of a downlink transmission burst from the BS in the unlicensed band; and receiving the downlink signal by performing second PDCCH monitoring at a second periodicity different from the first periodicity in the unlicensed band, wherein the second PDCCH monitoring may be performed from a slot after N slots with respect to a slot in which the initial signal is received during transmission of the downlink transmission burst, The second periodicity may correspond to one slot duration.

The second PDCCH monitoring based on the second periodicity may include monitoring a PDCCH at the second periodicity at a slot boundary at which each slot starts.

The first periodicity may be shorter than the second periodicity.

The first periodicity may be indicated or configured by physical layer signaling or higher layer signaling.

First PDCCH candidates for the first PDCCH monitoring based on the first periodicity at the slot boundary at which each slot starts may have a relationship of inclusion with second PDCCH candidates for the second PDCCH monitoring based on the second periodicity.

In the present disclosure, the initial signal may be one of the following:
  a synchronization signal modified for extension in the frequency domain;
  a demodulation reference signal (DM-RS) for a physical broadcast channel (PBCH) modified for the extension in the frequency domain;
  a DM-RS for the PDCCH;
  a group common PDCCH;
  a cell-specific channel state information reference signal (CSI-RS); and
  a cyclic prefix (CP) for some symbols of the downlink transmission burst or a part of the CP.

The group common PDCCH may include slot format indicator (SFI) information.

In this case, receiving, by the UE, the group common PDCCH as the initial signal may include: detecting a DM-RS for the group common PDCCH; decoding the group common PDCCH based on the DM-RS; and obtaining the presence of the downlink transmission burst from the BS by checking whether a cyclic redundancy check (CRC) result for the group common PDCCH is successful.

In another aspect of the present disclosure, provided is a method of transmitting a downlink signal by a base station (BS) to a user equipment (UE) in a wireless communication system supporting an unlicensed band. The method may include: performing a channel access procedure (CAP) for transmitting the downlink signal in the unlicensed band; and transmitting an initial signal and a downlink transmission burst including a physical downlink control channel (PDCCH) in the unlicensed band based on the CAP. The PDCCH included in the downlink transmission burst may be transmitted to the UE at a predetermined periodicity during the transmission of the downlink transmission burst.

The predetermine periodicity may correspond to one slot duration.

In the present disclosure, the initial signal may be one of the following:
- a synchronization signal modified for extension in a frequency domain;
- a demodulation reference signal (DM-RS) for a physical broadcast channel (PBCH) modified for the extension in the frequency domain;
- a DM-RS for the PDCCH;
- a group common PDCCH;
- a cell-specific channel state information reference signal (CSI-RS); and
- a cyclic prefix (CP) for some symbols of the downlink transmission burst or a part of the CP.

The group common PDCCH may include slot format indicator (SFI) information.

In still another aspect of the present disclosure, provided is a communication device for receiving a downlink signal from a base station (BS) in a wireless communication system supporting an unlicensed band. The communication device may include a memory and a processor connected to the memory. The processor may be configured to: receive the downlink signal by performing first physical downlink control channel (PDCCH) monitoring at a first periodicity in the unlicensed band; receive an initial signal informing the presence of a downlink transmission burst from the BS in the unlicensed band; and receive the downlink signal by performing second PDCCH monitoring at a second periodicity different from the first periodicity in the unlicensed band, wherein the second PDCCH monitoring may be performed from a slot after N slots with respect to a slot in which the initial signal is received during transmission of the downlink transmission burst.

Additionally or alternatively, the communication device is a part of an autonomous driving device that communicates with at least one of a network or another autonomous driving vehicle.

In a further aspect of the present disclosure, provided is a communication device for transmitting a downlink signal to a user equipment (UE) in a wireless communication system supporting an unlicensed band. The communication device may include a memory and a processor connected to the memory. The processor may be configured to: perform a channel access procedure (CAP) for transmitting the downlink signal in the unlicensed band; and transmit an initial signal and a downlink transmission burst including a physical downlink control channel (PDCCH) in the unlicensed band based on the CAP. The PDCCH included in the downlink transmission burst may be transmitted to the UE at a predetermined periodicity during the transmission of the downlink transmission burst.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to the present disclosure, a UE may recognize/obtain based on an initial signal transmitted from a BS whether there is a downlink transmission burst to be transmitted from the BS in an unlicensed band and adaptively adjust the periodicity of PDCCH monitoring based on such recognition, thereby improving the power saving spectral efficiency of the UE.

It will be appreciated by persons skilled in the art that the effects that could be achieved with the present disclosure are not limited to what has been particularly described hereinabove and other advantages of the present disclosure will be more clearly understood from the following detailed description. That is, effects which are not intended by the present disclosure may be derived by those skilled in the art from the embodiments of the present disclosure.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

DETAILED DESCRIPTION

Figure 1:
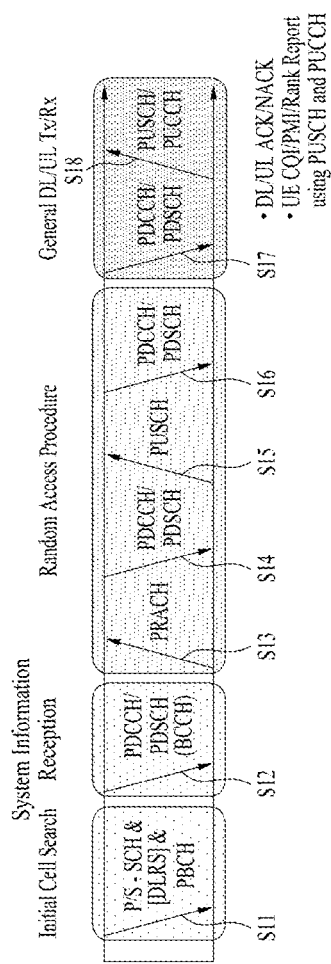
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the embodiments of the present disclosure are described in the context of 3GPP LTE/LTE-A systems and 3GPP NR system in order to clarify the technical features of the present disclosure, the present disclosure is also applicable to an IEEE 802.16e/m system, etc.

1. 3GPP LTE/LTE-A SYSTEM

1.1. Physical Channels and Transmitting/Receiving Signal

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2A:
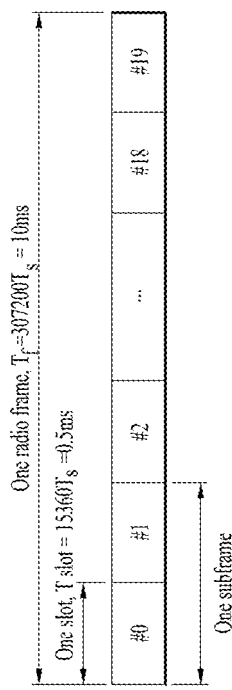
FIGS. 2A and 2B are diagrams illustrating radio frame structures.
Figure 2B:
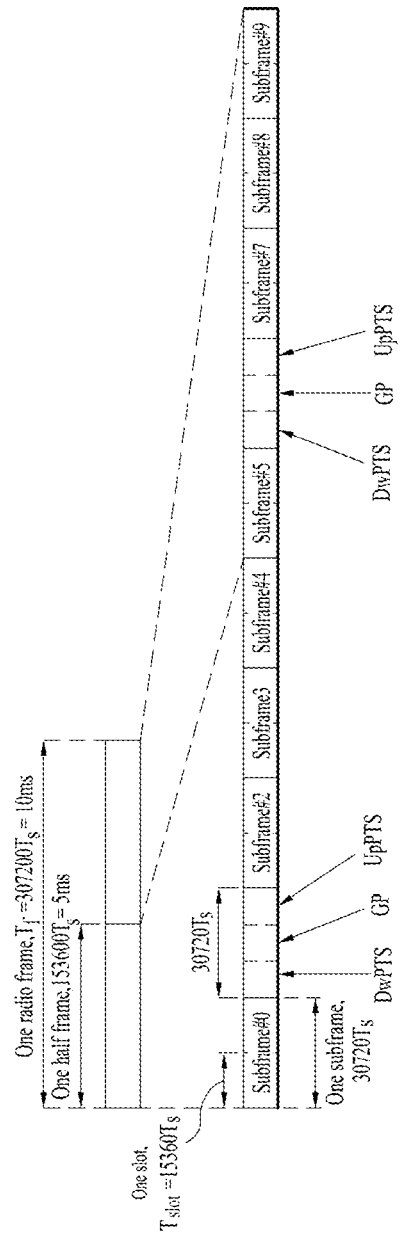

FIGS. 2A and 2B are diagrams illustrating radio frame structures applicable to the embodiments of the present disclosure.

FIG. 2A illustrates frame structure type 1. Frame type 1 is applicable to both a full frequency division duplex (FDD) system and a half FDD system.

One radio frame has a duration of $T_f=307200*T_s=10$ ms and includes 20 slots, which are indexed from 0 to 19. Each of the slots has a duration of $T_{slot}=15360*T_s=0.5$ ms. One subframe is defined as two consecutive slots, and more specifically, subframe #i is defined as slot #2i and slot #2i+1. That is, a radio frame includes 10 subframes. The time required for transmitting one subframe is defined as a transmission time interval (TTI). $T_s$ denotes a sampling time and is given as $T_s=1/(15 \text{ kHz} \times 2048)=3.2552 \times 10^{-8}$ (about 33 ns). A slot includes a plurality of orthogonal frequency division multiplexing (OFDM) symbols or single carrier orthogonal frequency division multiplexing (SC-FDMA) symbols in the time domain and a plurality of resource blocks (RBs) in the frequency domain.

One slot includes a plurality of OFDM symbols in the time domain. Since OFDMA is adopted for DL in the 3GPP LTE system, one OFDM symbol represents one symbol duration. An OFDM symbol may be replaced with an SC-FDMA symbol. An RB is a resource allocation unit including a plurality of consecutive subcarriers in one slot.

In the full FDD system, 10 subframes may be used for DL and UL transmission at the same time for a duration of 10 ms. In this case, the DL and UL transmission may be separated in the frequency domain. However, in the half FDD system, a UE may not perform transmission and reception simultaneously.

The above-described radio frame structure is merely exemplary. Thus, the number of subframes in a radio frame, the number of slots in a subframe, or the number of OFDM symbols in a slot may be changed in various manners.

FIG. 2B illustrates frame structure type 2. Frame structure type 2 is applied to a time division duplex (TDD) system. One radio frame has a duration of $T_f=307200*T_s=10$ ms and includes two half-frames, each of which has a duration of $153600*T_s=5$ ms. Each half-frame includes 5 subframes each having a duration of $30720*T_s=1$ ms. Subframe #i includes two slots: slot #i and slot #2i+1, each having a duration of $T_{slot}=15360*T_s=0.5$ ms, where Ts denotes a sampling time and is given as $T_s=1/(15 \text{ kHz} \times 2048)=3.2552 \times 10^{-8}$ (about 33 ns).

A Type 2 frame includes a special subframe including three fields: a downlink pilot time slot (DwPTS), a guard period (GP), and an uplink pilot time slot (UpPTS). The DwPTS is used for initial cell search, synchronization, or channel estimation at a UE, and the UpPTS is used for channel estimation at an eNB and acquisition of UL transmission synchronization at a UE. The GP is a period for cancelling UL interference caused by DL signal multipath delay between DL and UL.

Table 1 below shows special subframe configurations (DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the LTE Rel-13 system, it has been allowed to change the special frame configurations (e.g., DwPTS/GP/UpPTS lengths) by considering the number of additional SC-FDMA symbols X (which is provided by the higher layer parameter named srs-UpPtsAdd) (if this parameter is not configured, X is set to 0). In the LTE Rel-14 system, specific subframe configuration #10 has been newly added. A UE may expect not to be configured with two additional UpPTS SC-FDMA symbols for special subframe configurations {3, 4, 7, 8} with a normal cyclic prefix in DL for special subframe configurations {3, 4, 7, 8} for a normal cyclic prefix (CP) in DL and special subframe configurations {2, 3, 5, 6} for an extended CP in DL. In addition, the UE may expect not to be configured with four additional UpPTS SC-FDMA symbols for special subframe configurations {1, 2, 3, 4, 6, 7, 8} for the normal CP in DL and special subframe configurations {1, 2, 3, 5, 6} for the extended CP in DL.

Figure 4:
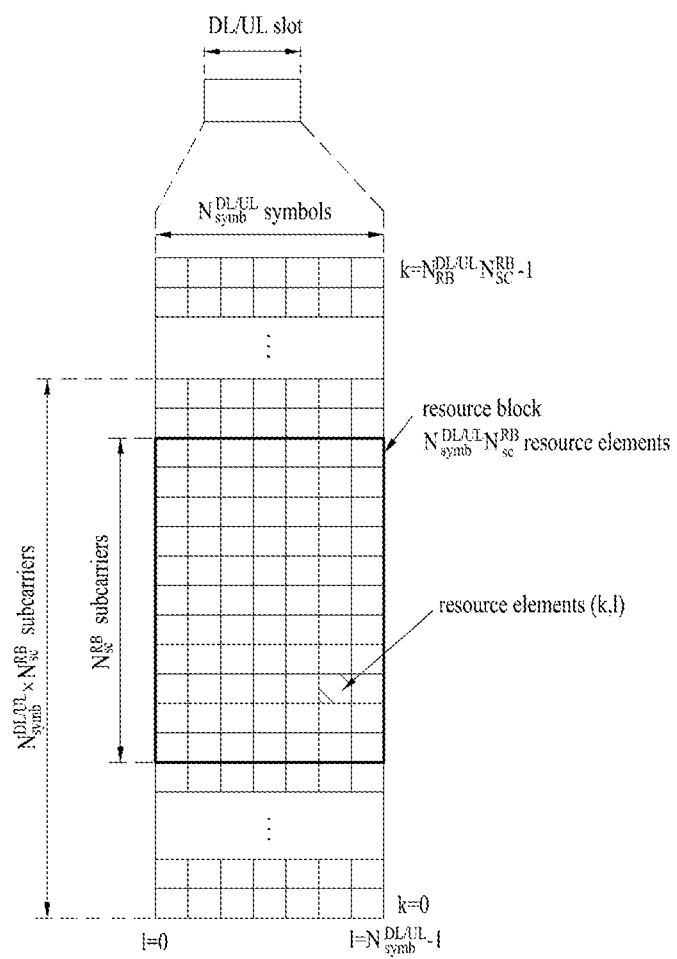
FIG. 4 is a diagram illustrating a resource grid for a downlink slot.

FIG. 4 illustrates a resource grid of a DL slot applicable to the embodiments of the present disclosure.

Referring to FIG. 4, a DL slot includes a plurality of OFDM symbols in the time domain. Although FIG. 4 illustrates that one DL slot includes 7 OFDM symbols and one RB includes 12 subcarriers in the frequency domain, the present disclosure is not limited thereto.

Each element on the resource grid is referred to as a resource element (RE). One RB includes 12×7 REs. The number of RBs included in a DL slot, $N^{DL}$ depends on a DL transmission bandwidth.

Figure 5:
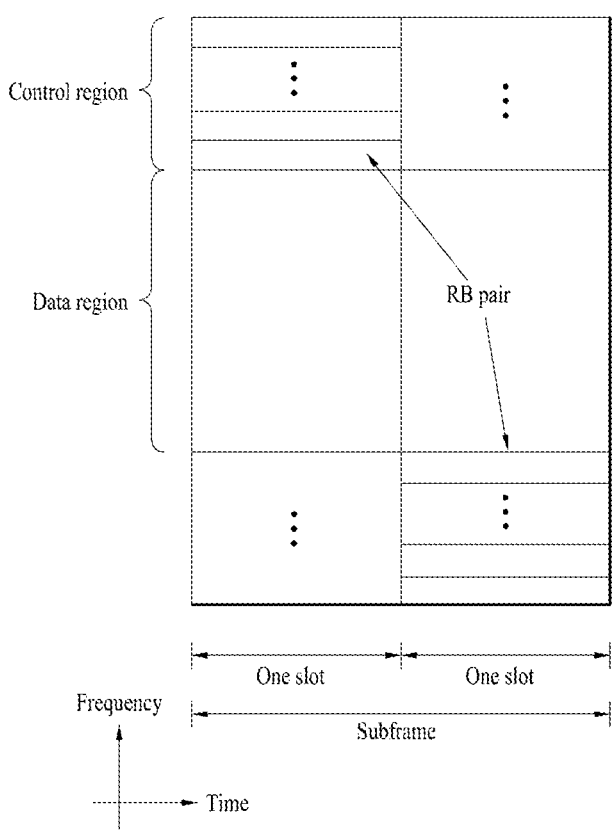
FIG. 5 is a diagram illustrating an uplink subframe structure.

FIG. 5 illustrates a UL subframe structure applicable to the embodiments of the present disclosure.

Referring to FIG. 5, a UL subframe may be divided into a control region and a data region in the frequency domain. A PUCCH carrying UCI is allocated to the control region, and a PUSCH carrying user data is allocated to the data

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
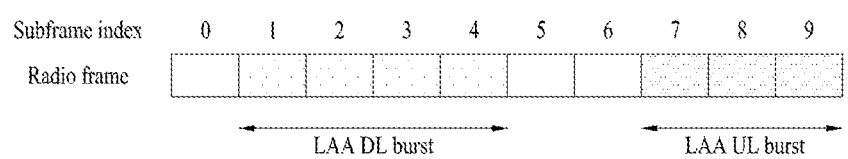
FIG. 3 is a diagram illustrating frame structure type 3.

FIG. 3 is a diagram illustrating frame structure type 3.

Frame structure type 3 may be applied to UCell operation. Frame type 3 may be applied to licensed assisted access (LAA) SCell operation with a normal CP, but it is not limited thereto. A frame has a duration of 10 ms, and thus it is defined as 10 1-ms subframes. Subframe #i is defined as two consecutive slots: slot #2i and slot #2i+1. Each subframe may be used for DL or UL transmission or left empty. A DL burst occupies one or more consecutive subframes, starting at any point in a subframe and ending at the boundary thereof or in the DwPTS of Table 3. A UL burst also occupies one or more consecutive subframes.

region. A UE does not transmit the PUCCH and the PUSCH at the same time to maintain a single carrier property. For one UE, the PUCCH is allocated to a pair of RBs in a subframe. The RBs belonging to the RB pair occupy different subcarriers in two slots. Thus, it is said that the RB pair allocated as the PUCCH is frequency-hopped in a slot boundary.

Figure 6:
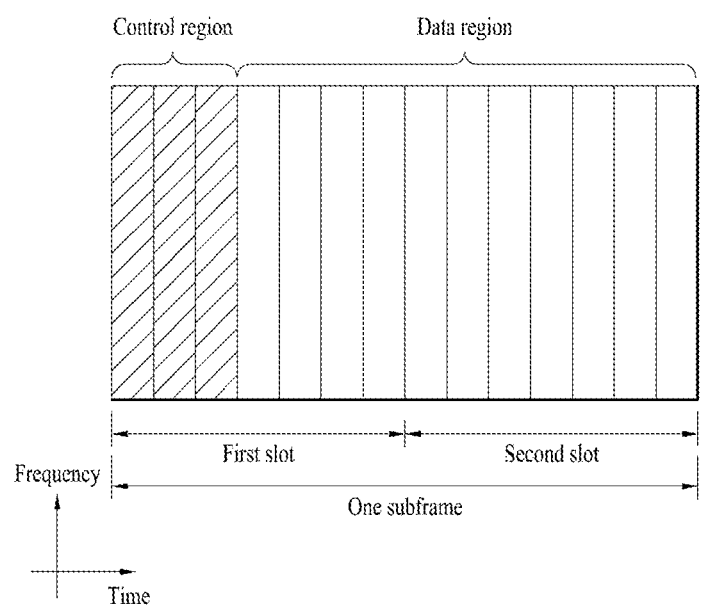
FIG. 6 is a diagram illustrating a downlink subframe structure.

FIG. 6 illustrates a DL subframe structure applicable to the embodiments of the present disclosure.

Referring to FIG. 6, up to three OFDM symbols from OFDM symbol index 0 of the first slot in a subframe may correspond to a control region in which control channels are allocated, and the remaining OFDM symbols may correspond to a data region in which a PDSCH is allocated. In the 3GPP LTE system, the following downlink control channels are used: a physical control format indicator channel (PCFICH), a PDCCH, a physical hybrid-ARQ indicator channel (PHICH), etc.

The PCFICH is transmitted in the first OFDM symbol of a subframe, conveying information about the number of OFDM symbols (i.e., the size of a control region) used for transmission of control channels in the subframe. The PHICH is a response channel for a UL transmission, conveying a hybrid automatic repeat request (HARD) acknowledgement (ACK)/negative acknowledgement (NACK) signal. Control information delivered on the PDCCH is called downlink control information (DCI). The DCI includes UL resource allocation information, DL resource control information, or a UL transmit (Tx) power control command for any UE group.

1.3. Dual Connectivity

Figure 7:
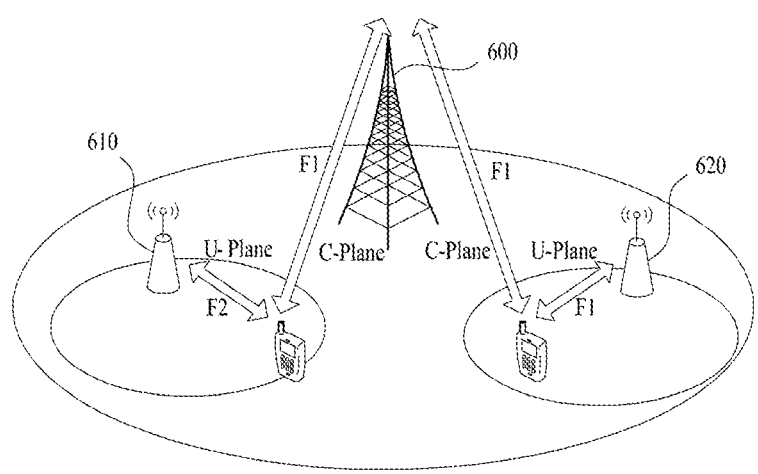
FIG. 7 is a diagram for explaining the concept of dual connectivity applicable to the present disclosure.

FIG. 7 is a diagram for explaining the concept of dual connectivity applicable to the present disclosure.

Referring to FIG. 7, carrier aggregation may be performed between a macro cell 600 and small cells 610 and 620. That is, the macro cell may use n carriers (where n is a random positive integer), and the small cell may use k carriers (where k is a random positive integer). In this case, the macro and small cells may use the same frequency carriers or different frequency carriers. For example, the macro cell may use any frequencies F1 and F2, and the small cell may use any frequencies F2 and F3.

A random UE in the coverage of the small cell may be connected to the macro and small cells at the same time. Thus, the UE may be served by the macro and small cells at the same time or through time division multiplexing (TDM). Functions provided by the C-plane (e.g., connection management, mobility, etc.) may be served to the UE through a macro-cell layer. In the case of the U-plane data path, either or both of the macro cell and small cell may be selected. For example, in the case of real-time data such as Voice over LTE (VoLTE), the UE may perform transmission/reception with the macro cell capable of guaranteeing higher mobility than the small cell. For a best-effort service, the UE may be served by the small cell. The macro and small cells may be connected through backhaul, and the backhaul may be ideal backhaul or non-ideal backhaul.

The macro and small cells may be configured with the same system. For example, when one cell is configured with one of the FDD or TDD systems, the other cell may be configured with the same system. Alternatively, the macro and small cells may be configured with different systems. For example, one cell may be configured with the TDD system, and the other cell may be configured with the FDD system.

The concept of the dual connectivity has been described above with reference to FIG. 7. The macro and small cells may use the same frequency bands or different frequency bands. If a random UE is configured to operate in dual connectivity mode, the UE may be connected to the macro and small cells at the same time. FIG. 7 shows a case in which the U-plane data path is set in the small cell.

Although the present disclosure describes that a random UE is dual-connected to macro and small cells for convenience of description, the disclosure is not limited to cell types (e.g., a macro cell, micro cell, pico cell, femto cell, etc.). In addition, although the present disclosure describes that a random dual-connectivity UE configures carrier aggregation (CA) by setting a macro cell to a primary cell (PCell) and a small cell to a secondary cell (SCell), the disclosure is not limited thereto.

In particular, according to the present disclosure, a single UE may be dual-connected to an eNB (supporting an unlicensed band) in the LTE system and a transmission reception point (TRP) in the NR system.

2. NEW RADIO (NR) SYSTEM

As more and more communication devices require greater communication capacity, there is a need for mobile broadband communication enhanced over existing radio access technology (RAT). In addition, massive machine-type communications (MTC) capable of providing a variety of services anywhere and anytime by connecting multiple devices and objects is also considered. Communication system design considering services/UEs sensitive to reliability and latency is also under discussion.

As a number of communication devices have required higher communication capacity, the necessity for the mobile broadband communication enhanced over the existing radio access technology (RAT) has increased. In addition, massive machine type communications (MTC) capable of providing various services anytime and anywhere by connecting a number of devices or things to each other has also been considered. Moreover, a communication system design capable of supporting services/UEs sensitive to reliability and latency has been discussed. In the present disclosure, the corresponding technology is referred to as new RAT or new radio (NR).

2.1. Numerologies

The NR system to which the present disclosure is applicable supports various OFDM numerologies as shown in Table 2 below. The value of µ and cyclic prefix information per carrier bandwidth part may be signaled for DL and UL, respectively. For example, the value of µ and cyclic prefix information for a DL carrier bandwidth part may be signaled though higher layer signaling such as DL-BWP-mu and DL-MWP-cp. As another example, the value of µ and cyclic prefix information for a UL carrier bandwidth part may be signaled though higher layer signaling such as UL-BWP-mu and UL-MWP-cp.

TABLE 3

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2. Frame Structure

DL and UL transmission are configured with frames each having a duration of 10 ms. Each frame may include 10 subframes, each having a duration of 1 ms. In this case, the number of consecutive OFDM symbols in each subframe is $N_{symb}^{subframe,\mu}=N_{symb}^{slot}N_{slot}^{subframe,\mu}$.

Each frame may include two half-frames with the same size. In this case, the two half-frames may include subframes 0 to 4 and subframes 5 to 9, respectively.

Regarding the subcarrier spacing µ, slots in one subframe may be numbered in ascending order as follows: $n_s^\mu = \{0, \ldots, N_{slot}^{subframe,\mu}-1\}$, and slots in one frame may be numbered in ascending order as follow: $n_{s,f}^\mu \in \{0, \ldots, N_{slot}^{frame,\mu}-1\}$. In this case, the number of consecutive OFDM symbols in one slot ($N_{symb}^{slot}$) may be determined as shown in Tables 4 and 5 below according to the CP. The start slot ($n_s^\mu$) in a subframe is aligned with the start OFDM symbol ($n_s^\mu N_{symb}^{slot}$) in the corresponding subframe in the time domain. Table 3 shows the number of OFDM symbols in each slot/frame/subframe in the case of a normal CP, and Table 4 shows the number of OFDM symbols in each slot/frame/subframe in the case of an extended CP.

TABLE 4

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame, \mu}$ | $N_{slot}^{subframe, \mu}$ |
|---|---|---|---|
| 2 | 12 | 40 | 4 |

The NR system to which the present disclosure is applicable may employ a self-contained slot structure as the above-described slot structure.

Figure 8:
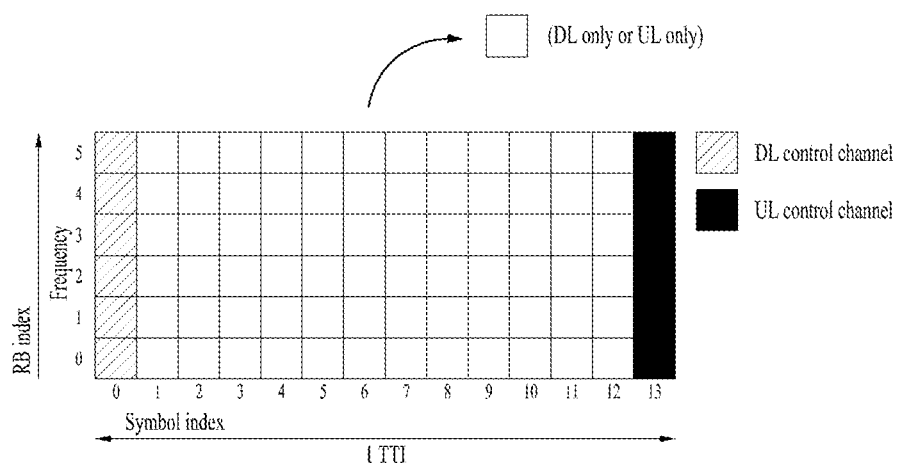
FIG. 8 is a diagram illustrating a self-contained slot structure applicable to the present disclosure.

FIG. 8 is a diagram illustrating a self-contained slot structure applicable to the present disclosure.

In FIG. 8, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, an eNB and a UE may sequentially perform DL transmission and UL transmission in one slot. That is, the eNB and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the eNB and UE to switch from transmission mode to reception mode and vice versa. To this end, in the self-contained slot structure, some OFDM symbols at the time of switching from DL to UL may be configured as a GP.

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 8.

For example, a slot may have various slot formats. In this case, OFDM symbols in each slot may be classified into a DL symbol (denoted by 'D'), a flexible symbol (denoted by 'X'), and a UL symbol (denoted by 'U').

Thus, a UE may assume that DL transmission occurs only in symbols denoted by 'D' and 'X' in a DL slot. Similarly, the UE may assume that UL transmission occurs only in symbols denoted by 'U' and 'X' in a UL slot.

2.3. Analog Beamforming

In a millimeter wave (mmW) system, since a wavelength is shortened, a plurality of antenna elements may be installed in the same area. That is, considering that the wavelength at 30 GHz band is 1 cm, a total of 100 antenna elements may be installed in a 5*5 cm panel at intervals of 0.5 lambda (wavelength) in the case of a 2-dimensional array. Therefore, in the mmW system, it is possible to improve coverage or throughput by increasing the beamforming (BF) gain using multiple antenna elements.

In this case, each antenna element may include a transceiver unit (TXRU) to enable adjustment of transmission power and phases per antenna element. By doing so, each antenna element may perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 9:
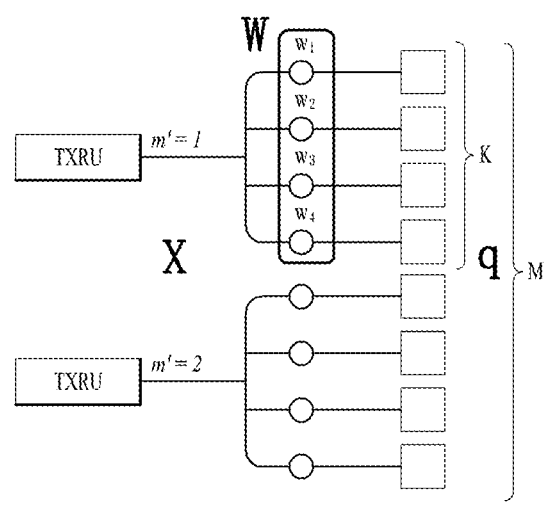
FIGS. 9 and 10 are diagrams illustrating representative methods of connecting transceiver units (TXRUs) to antenna elements.
Figure 10:
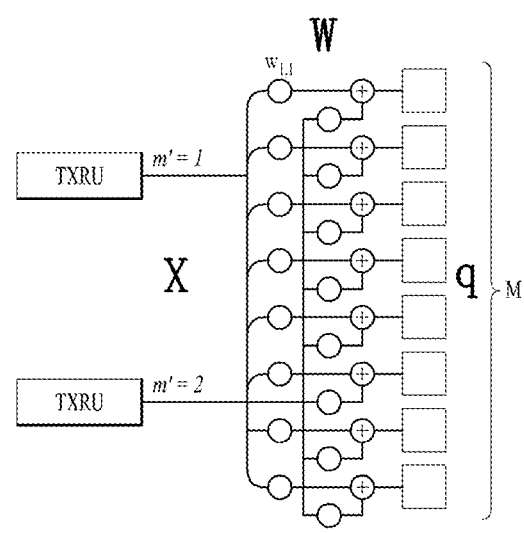

FIGS. 9 and 10 are diagrams illustrating representative methods for connecting TXRUs to antenna elements. Here, the TXRU virtualization model represents the relationship between TXRU output signals and antenna element output signals.

FIG. 9 shows a method for connecting TXRUs to subarrays. In FIG. 9, one antenna element is connected to one TXRU.

FIG. 10 shows a method for connecting all TXRUs to all antenna elements. In FIG. 10, all antenna elements are connected to all TXRUs. In this case, extra addition units are required to connect all antenna elements to all TXRUs as shown in FIG. 10.

In FIGS. 9 and 10, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 9 has a disadvantage in that it is difficult to achieve beamforming focusing but has an advantage in that all antennas can be configured at low cost.

On the contrary, the configuration shown in FIG. 10 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D)) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 11:
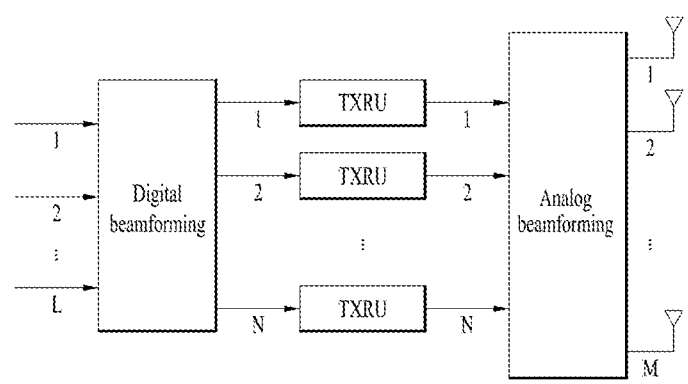
FIG. 11 is a schematic diagram illustrating a hybrid beamforming structure from the perspective of TXRUs and physical antennas according to an example of the present disclosure.

FIG. 11 is a diagram schematically illustrating an exemplary hybrid BF structure from the perspective of TXRUs and physical antennas according to the present disclosure. In FIG. 11, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 11, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 12:
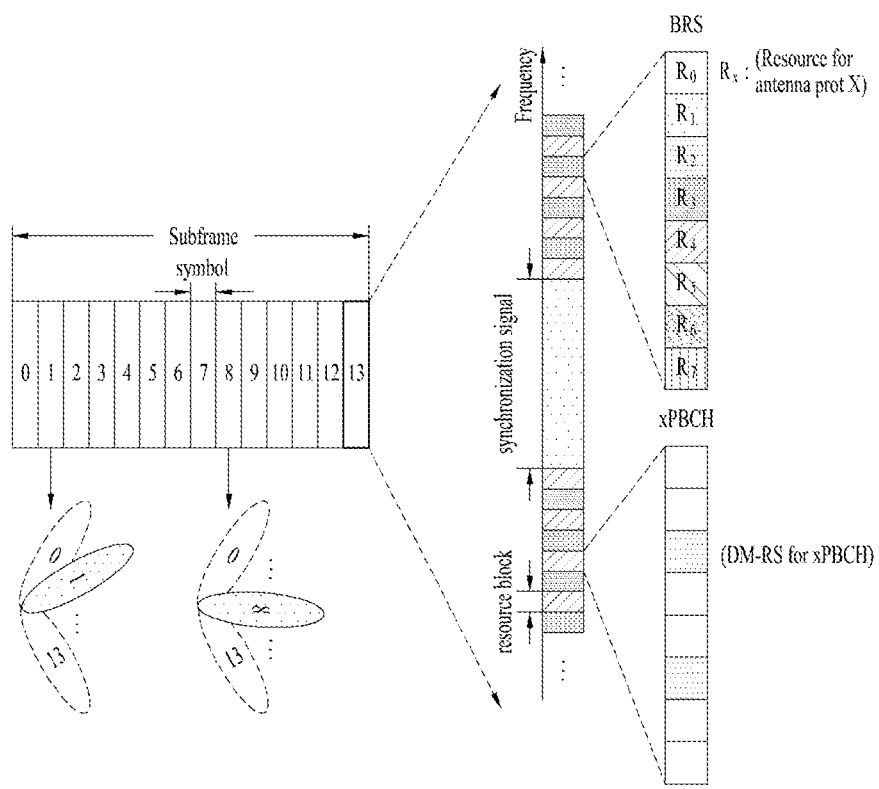
FIG. 12 is a schematic diagram illustrating a beam sweeping operation for a synchronization signal and system information in a downlink transmission procedure according to an example of the present disclosure.

FIG. 12 is a diagram schematically illustrating an exemplary beam sweeping operation for a synchronization signal and system information in a DL transmission procedure according to the present disclosure.

In FIG. 12 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 12, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

2.4. Synchronization Signal Block (SSB) or SS/PBCH Block

In the NR system to which the present disclosure is applicable, a primary synchronization signal (PSS), a secondary synchronization signal (SSS), and/or a physical broadcast signal (PBCH) may be transmitted in one SS block or SS PBCH block (hereinafter, referred to as an SSB or SS/PBCH block). Multiplexing other signals may not be precluded within the SSB.

The SS/PBCH block may be transmitted in a band other than the center of a system band. Particularly, when the BS supports broadband operation, the BS may transmit multiple SS/PBCH blocks.

Figure 13:
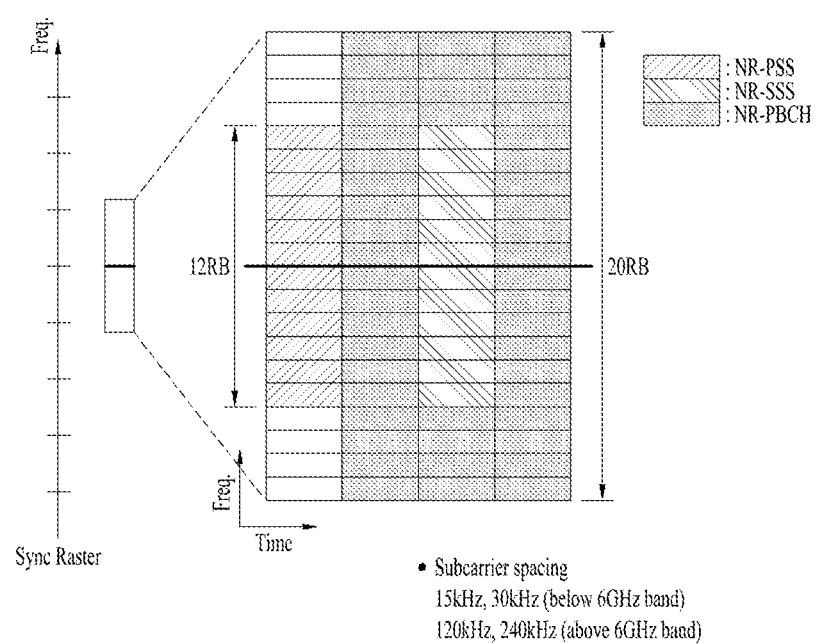
FIG. 13 is a schematic diagram illustrating a synchronization signal/physical broadcast channel (SS/PBCH) block applicable to the present disclosure.

FIG. 13 is a schematic diagram illustrating an SS/PBCH block applicable to the present disclosure.

As illustrated in FIG. 13, the SS/PBCH block applicable to the present disclosure may include 20 RBs in four consecutive OFDM symbols.

Further, the SS/PBCH block may be transmitted even in a frequency band other than the center frequency of a frequency band used by the network.

For this purpose, a synchronization raster being candidate frequency positions at which the UE should detect the SS/PBCH block is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

Figure 14:
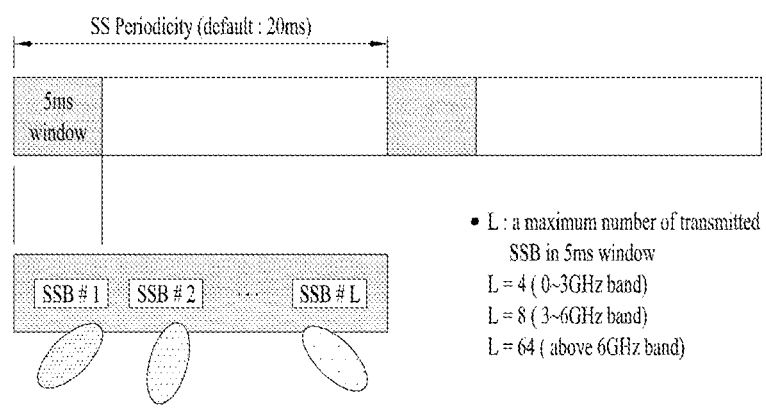
FIG. 14 is a schematic diagram illustrating an SS/PBCH block transmission configuration applicable to the present disclosure.

FIG. 14 is a schematic diagram illustrating an SS/PBCH block transmission structure applicable to the present disclosure.

In the NR system to which the present disclosure is applicable, the BS may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the BS may set a larger maximum number of beams available for SS/PBCH block transmission within 5 ms. For example, the BS may transmit the SS/PBCH block by using up to 4 different beams at or below 3 GHz, up to 8 different beams at 3 to 6 GHz, and up to 64 different beams at or above 6 GHz, for 5 ms.

2.5. Synchronization Procedure

The UE may acquire synchronization by receiving the above-described SS/PBCH block from the BS. The synchronization procedure largely includes cell ID detection and timing detection. The cell ID detection may include PSS-based cell ID detection and SSS-based cell ID detection. The timing detection may include PBCH DMRS-based timing detection and PBCH contents-based (e.g., MIB-based) timing detection.

First, the UE may acquire timing synchronization and the physical cell ID of a detected cell by detecting a PSS and an SSS. More specifically, the UE may acquire the symbol timing of the SS block and detect a cell ID within a cell ID group, by PSS detection. Subsequently, the UE detects the cell ID group by SSS detection.

Further, the UE may detect the time index (e.g., slot boundary) of the SS block by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI in a frequency band indicated by the PBCH or a frequency band carrying the PBCH, after decoding of the PBCH.

2.6. Quasi Co-Located or Quasi Co-Location (QCL)

In the present disclosure, QCL may mean one of the following.

(1) If two antenna ports are "quasi co-located (QCL)", the UE may assume that large-scale properties of a signal received from a first antenna port may be inferred from a signal received from the other antenna port. The "large-scale properties" may include one or more of the following.

Delay spread
Doppler spread
Frequency shift
Average received power
Received Timing (2) If two antenna ports are "quasi co-located (QCL)", the UE may assume that large-scale properties of a channel over which a symbol on one antenna port is conveyed may be inferred from a channel over which a symbol on the other antenna port is conveyed). The "large-scale properties" may include one or more of the following.

Delay spread
Doppler spread
Doppler shift
Average gain
Average delay
Average angle (AA): When it is said that QCL is guaranteed between antenna ports in terms of AA, this may imply that when a signal is to be received from other antenna port(s) based on an AA estimated from specific antenna port(s), the same or similar reception beam direction (and/or reception beam width/sweeping degree) may be set and the reception is processed accordingly (in other words, that when operated in this manner, reception performance at or above a certain level is guaranteed).
Angular spread (AS): When it is said that QCL is guaranteed between antenna ports in terms of AS, this may imply that an AS estimated from one antenna port may be derived/estimated/applied from an AS estimated from another antenna port.
Power Angle(-of-Arrival) Profile (PAP): When it is said that QCL is guaranteed between antenna ports in terms of PAP, this may imply that a PAP estimated from one antenna port may be derived/estimated/applied from a PAP estimated from another antenna port (or the PAPs may be treated as similar or identical).

In the present disclosure, both of the concepts defined in (1) and (2) described above may be applied to QCL. Alternatively, the QCL concepts may be modified such that it may be assumed that signals are transmitted from a co-location, for signal transmission from antenna ports for which the QCL assumption is established (e.g., the UE may assume that the antenna ports are transmitted from the same transmission point).

In the present disclosure, partial QCL between two antenna ports may mean that at least one of the foregoing QCL parameters for one antenna port is assumed/applied/used as the same as for the other antenna port (when an associated operation is applied, performance at or above a certain level is guaranteed).

2.7. Bandwidth Part (BWP)

In the NR system to which the present disclosure is applicable, frequency resources of up to 400 MHz per component carrier (CC) may be allocated/supported. When a UE operating in such a wideband CC always operates with a radio frequency (RF) module for the entire CCs turned on, battery consumption of the UE may increase.

Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC.

Alternatively, the maximum bandwidth capability may be different for each UE.

In consideration of the above situation, the BS may indicate/configure the UE to operate only in a partial bandwidth instead of the entire bandwidth of the wideband CC. The partial bandwidth may be defined as a BWP.

A BWP may include contiguous RBs on the frequency axis, and one BWP may correspond to one numerology (e.g., SCS, CP length, slot/mini-slot duration, and so on).

The BS may configure a plurality of BWPs in one CC configured for the UE. For example, the BS may configure a BWP occupying a relatively small frequency area in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells.

The BS may configure at least one DL/UL BWP for a UE associated with the wideband CC, and activate at least one of DL/UL BWPs configured at a specific time point (by L1 signaling (e.g., DCI or the like), MAC signaling, RRC signaling, or the like). The activated DL/UL BWP may be referred to as an active DL/UL BWP. During initial access or before an RRC connection setup, the UE may not receive a configuration for a DL/UL BWP from the BS. A DL/UL BWP assumed for the UE is defined as an initial active DL/UL BWP.

3. UNLICENSED BAND SYSTEM

Figure 15A:
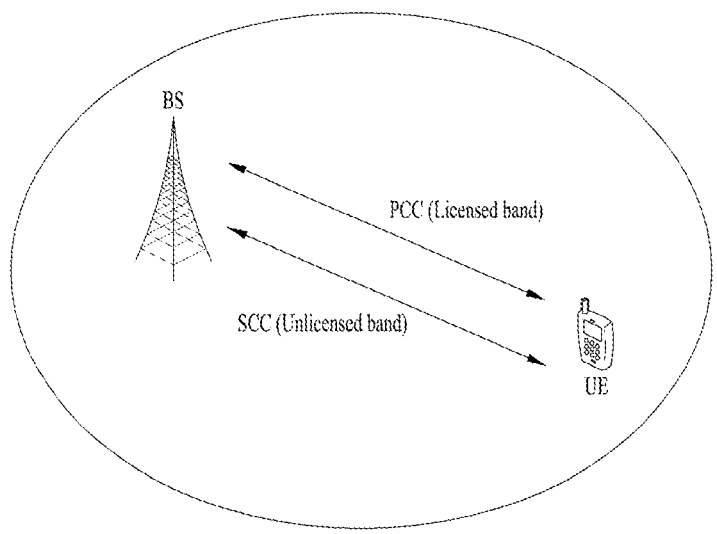
FIGS. 15A and 15B illustrate an exemplary wireless communication system supporting an unlicensed band, which is applicable to the present disclosure.
Figure 15B:
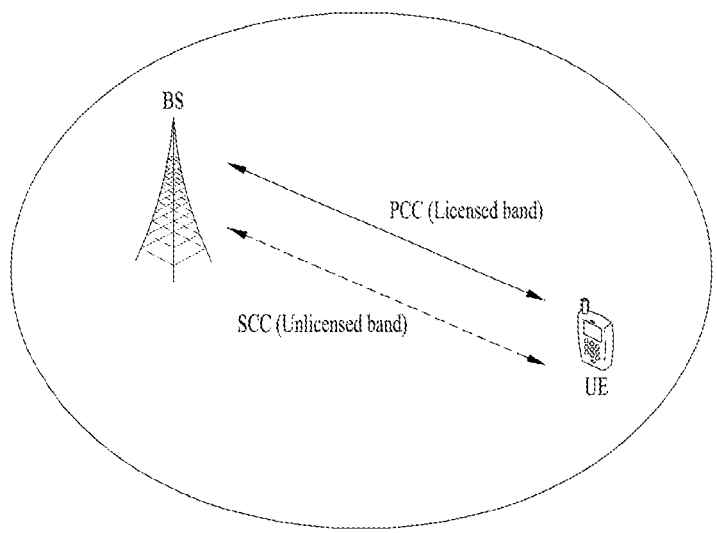

FIGS. 15A and 15B illustrate an exemplary wireless communication system supporting an unlicensed band, which is applicable to the present disclosure.

In the following description, a cell operating in a licensed band (hereinafter, referred to as L-band) is defined as an L-cell, and a carrier of the L-cell is defined as a (DL/UL) LCC. In addition, a cell operating in an unlicensed band (hereinafter, referred to as a U-band) is defined as a U-cell, and a carrier of the U-cell is defined as a (DL/UL) UCC. The carrier/carrier-frequency of the cell may refer to the operating frequency (e.g., center frequency) of the cell. A cell/carrier (e.g., CC) is collectively referred to as a cell.

As illustrated in FIG. 15A, when the UE and the BS transmit and receive signals in carrier-aggregated LCC and UCC, the LCC may be configured as a primary CC (PCC) and the UCC may be configured as a secondary CC (SCC).

As illustrated in FIG. 15B, the UE and the BS may transmit and receive signals in one UCC or a plurality of carrier-aggregated LCC and UCC. That is, the UE and the BS may transmit and receive signals only in the UCC(s) without the LCC.

The above-described operation of transmitting and receiving a signal in a U-band according to the present disclosure may be performed based on all the deployment scenarios described above (unless otherwise stated).

3.1. Radio Frame Structure for Unlicensed Band

For operation in U-bands, LTE frame structure type 3 (see FIG. 3) or the NR frame structure (see FIG. 8) may be used. The configuration of OFDM symbols reserved for UL/DL signal transmission in a frame structure for U-bands may be determined by a BS. In this case, the OFDM symbol may be replaced with an SC-FDM(A) symbol.

To transmit a DL signal in a U-band, the BS may inform a UE of the configuration of OFDM symbols used in subframe #n through signaling. Herein, a subframe may be replaced with a slot or a time unit (TU).

Specifically, in the LTE system supporting U-bands, the UE may assume (or recognize) the configuration of occupied OFDM symbols in subframe #n based on a specific filed in DCI (e.g., Subframe configuration for LAA' field, etc.), which is received in subframe #n−1 or subframe #n from the BS.

Table 6 shows how the Subframe configuration for LAA field indicates the configuration of OFDM symbols used to transmit DL physical channels and/or physical signals in the current or next subframe.

TABLE 6

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

To transmit a UL signal in a U-band, the BS may provide information on a UL transmission interval to the UE through signaling.

Specifically, in the LTE system supporting U-bands, the UE may obtain 'UL duration' and 'UL offset' information for subframe #n from the 'UL duration and offset' field in detected DCI.

Table 7 shows how the UL duration and offset field indicates the configurations of a UL offset and a UL duration.

TABLE 7

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) a UL offset l and a UL duration d for subframe #n, the UE may not need to receive DL physical channels and/or physical signals in subframe #n+l+i (where i=0, 1, . . . , d−1).

3.2. DL Channel Access Procedure (DL CAP)

For a DL signal transmission in the U-band, the BS may perform a DL CAP for the U-band. On the assumption that the BS is configured with a PCell that is a licensed band and one or more SCells which are U-bands, a DL CAP operation applicable to the present disclosure will be described below in detail, with the U-bands represented as licensed assisted access (LAA) SCells. The DL CAP operation may be applied in the same manner even when only a U-band is configured for the BS.

3.2.1. Channel Access Procedure for Transmission(s) Including PDSCH/PDCCH/EPDCCH The BS senses whether a channel is in an idle state for a slot duration of a defer duration $T_d$. After a counter N is decremented to 0 in step 4 as described later, the BS may perform a transmission including a PDSCH/PDCCH/EPDCCH on a carrier on which the next LAA SCell(s) transmission is performed. The counter N may be adjusted by sensing the channel for an additional slot duration according to the following procedure.

1) Set $N=N_{init}$ where $N_{init}$ is a random number uniformly distributed between 0 and $CW_p$, and go to step 4.
2) If N>0 and the BS chooses to reduce the counter, set N=N−1.
3) Sense the channel for an additional slot duration, and if the additional slot duration is idle, go to step 4. Else, go to step 5.
4) If N=0, stop. Else, go to step 2.
5) Sense the channel until a busy slot is detected within the additional defer duration $T_d$ or all slots of the additional defer duration $T_d$ are sensed as idle.
6) If the channel is sensed as idle for all slot durations of the additional defer duration $T_d$, go to step 4. Else, go to step 5.

The above-described CAP for a transmission including a PDSCH/PDCCH/EPDCCH of the BS may be summarized as follows.

Figure 16:
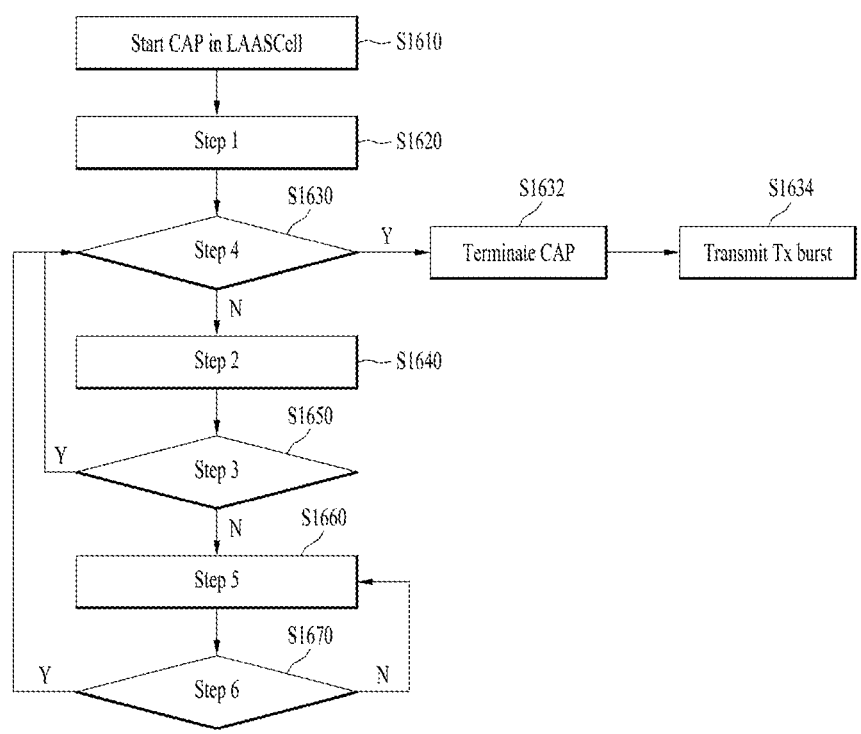
FIG. 16 is a diagram illustrating a channel access procedure (CAP) for transmission in an unlicensed band, which is applicable to the present disclosure.

FIG. 16 is a flowchart illustrating a CAP for transmission in a U-band, which is applicable to the present disclosure.

For a DL transmission, a transmission node (e.g., a BS) may initiate the CAP to operate in LAA SCell(s) which is U-band cell(s) (S1610).

The BS may randomly select a backoff counter N within a contention window (CW) according to step 1. N is set to an initial value, $N_{init}$ (S1620). $N_{init}$ is a random value selected from among the values between 0 and $CW_p$.

Subsequently, if the backoff counter N is 0 in step 4 (Y in S1630), the BS terminates the CAP (S1632). Subsequently, the BS may perform a Tx burst transmission including a PDSCH/PDCCH/EPDCCH (S1634). On the other hand, if the backoff counter N is not 0 (N in S1630), the BS decrements the backoff counter N by 1 according to step 2 (S1640).

Subsequently, the BS determines whether the channel of the LAA SCell(s) is in an idle state (S1650). If the channel is in the idle state (Y in S1650), the BS determines whether the backoff counter N is 0 (S1630).

On the contrary, if the channel is not idle in step S1650, that is, the channel is busy (N in S1650), the BS determines whether the channel is in the idle state for a defer duration $T_d$ (25 usec or more) longer than a slot time (e.g., 9 usec) according to step 5 (S1660). If the channel is idle for the defer duration (Y in S1670), the BS may resume the CAP.

For example, if the backoff counter $N_{init}$ is 10 and then reduced to 5, and the channel is determined to be busy, the BS senses the channel for the defer duration and determines whether the channel is idle. If the channel is idle for the defer duration, the BS may resume the CAP from a backoff counter value 5 (or from a backoff counter value 4 after decrementing the backoff counter value by 1).

On the other hand, if the channel is busy for the defer duration (N in S1670), the BS re-performs step S1660 to check again whether the channel is idle for a new defer duration.

In the above procedure, if the BS does not perform the transmission including the PDSCH/PDCCH/EPDCCH on the carrier on which a LAA SCell(s) transmission is performed after step 4, the BS may perform the transmission including the PDSCH/PDCCH/EPDCCH on the carrier, when the following conditions are satisfied:

When the BS is prepared to transmit the PDSCH/PDCCH/EPDCCH and the channel is sensed as idle for at least a slot duration $T_{sl}$, or for all slot durations of the defer duration $T_d$ immediately before the transmission; and On the contrary, when the BS does not sense the channel as idle for the slot duration $T_{sl}$ or for any of the slot durations of the defer duration $T_d$ immediately before the intended transmission, the BS proceeds to step 1 after sensing the channel as idle for a slot duration of the defer duration $T_d$.

The defer duration $T_d$ includes a duration of $T_f$ (=16 us) immediately followed by $m_p$ consecutive slot durations where each slot duration $T_{sl}$ is 9 us, and $T_f$ includes an idle slot duration $T_{sl}$ at the start of $T_f$.

If the BS senses the channel for the slot duration $T_{sl}$ and power detected by the BS for at least 4 us within the slot duration is less than an energy detection threshold $X_{Thresh}$, the slot duration $T_{sl}$ is considered to be idle. Otherwise, the slot duration $T_{sl}$ is considered to be busy.

$CW_{min,p} \leq CW_p \leq CW_{max,p}$ represents a contention window. $CW_p$ adjustment will be described in section 3.2.3.

$CW_{min,p}$ and $CW_{max,p}$ are chosen before step 1 of the above procedure.

$m_p$, $CW_{min,p}$, and $CW_{max,p}$ are based on a channel access priority class associated with the transmission of the BS (see Table 13 below).

$X_{Thresh}$ is adjusted according to section 3.2.4.

TABLE 8

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the BS performs a discovery signal transmission which does not include a PDSCH/PDCCH/EPDCCH when N>0 in the above procedure, the BS does not decrement N for a slot duration overlapping with the discovery signal transmission.

The BS does not continuously perform transmissions on the channel, for a period exceeding $T_{mcot,p}$ as given in Table 13 on the carrier on which an LASS SCell transmission is performed.

For p=3 and p=4 in Table 8, if the absence of any other technology sharing the carrier may be guaranteed on a long term basis (e.g., by level of regulation), $T_{mcot,p}$=10 ms and otherwise, $T_{mcot,p}$=8 ms.

3.2.2. Channel Access Procedure for Transmissions Including Discovery Signal Transmission(S) and not Including PDSCH If the transmission duration of the BS is 1 ms or less, the BS may perform a transmission including a discovery signal transmission without a PDSCH on a carrier on which a LAA SCell transmission is performed, immediately after a corresponding channel is sensed as idle for at least a sensing interval $T_{drs}$ (=25 us). $T_{drs}$ includes a duration of $T_f$ (=16 us) immediately followed by one slot duration $T_{sl}$ (=9 us). $T_f$ includes an idle slot duration $T_{sl}$ at the start of $T_f$. If the channel is sensed as idle for the slot duration $T_{drs}$, the channel is considered to be idle for $T_{drs}$.

3.2.3. Contention Window Adjustment Procedure

If the BS performs a transmission including a PDSCH associated with a channel access priority class p on a carrier, the BS maintains and adjusts a contention window value $CW_p$ by using the following procedures before step 1 of the procedure described in section 2.2.1. for the transmission (i.e., before performing a CAP):

1> Set $CW_p = CW_{min,p}$ for all priority classes p∈{1, 2, 3, 4}.

2> If at least 80% (z=80%) of HARQ-ACK values corresponding to PDSCH transmission(s) in a reference subframe k are determined to be NACK, the BS increments $CW_p$ for all priority classes p∈{1, 2, 3, 4} to the next higher allowed value and remains in step 2. Otherwise, the BS goes to step 1.

In other words, when the probability that the HARQ-ACK values corresponding to the PDSCH transmission(s) in reference subframe k are determined to be NACK is at least 80%, the BS increments a CW value set for each priority class to the next higher value. Alternatively, the BS maintains the CW value set for each priority class to be an initial value.

Reference subframe k is the starting subframe of the most recent transmission on the carrier made by the BS, for which at least some HARQ-ACK feedback is expected to be available.

The BS adjusts the $CW_p$ values for all priority classes $p \in \{1, 2, 3, 4\}$ only once based on the given reference subframe k.

If $CW_p = CW_{max,p}$, the next higher allowed value for the $CW_p$ adjustment $CW_{max,p}$.

The probability Z of determining HARQ-ACK values corresponding to PDSCH transmission(s) in reference subframe k to be NACK may be determined in consideration of the following.

- If the transmission(s) of the BS for which HARQ-ACK feedback is available starts in the second slot of subframe k, HARQ-ACK values corresponding to PDSCH transmission(s) in subframe k and additionally, HARQ-ACK values corresponding to PDSCH transmission(s) in subframe k+1 are used.
- If HARQ-ACK values correspond to PDSCH transmission(s) in the same LAA SCell allocated by an (E)PDCCH transmitted in LAA SCell,
- If an HARQ-ACK feedback for a PDSCH transmission of the BS is not detected or if the BS detects a 'DTX', 'NACK/DTX' or (any) other state, it is counted as NACK.
- If the HARQ-ACK values correspond to PDSCH transmission(s) in another LAA SCell allocated by an (E)PDCCH transmitted in the LAA SCell,
- If an HARQ-ACK feedback for a PDSCH transmission of the BS is detected, 'NACK/DTX' or (any) other state is counted as NACK and the 'DTX' state is ignored.
- If an HARQ-ACK feedback for a PDSCH transmission of the BS is not detected,
- If it is expected that the BS will use PUCCH format 1 with channel selection, the 'NACK/DTX' state corresponding to 'no transmission' is counted as NACK, and the 'DTX' state corresponding to 'no transmission' is ignored. Otherwise, the HARQ-ACK for the PDSCH transmission is ignored.
- If the PDSCH transmission has two codewords, an HARQ-ACK value for each codeword is considered individually.
- A bundled HARQ-ACK across M subframes is considered to be M HARQ-ACK responses.

If the BS performs a transmission which includes a PDCCH/EPDDCH with DCI format 0A/0B/4A/4B and does not include a PDSCH associated with the channel access priority class p on a channel starting from time $t_0$, the BS maintains and adjusts the competing window size $CW_p$ by using the following procedures before step 1 of the procedure described in section 3.2.1. for the transmission (i.e., before performing the CAP):

1> Set $CW_p = CW_{min,p}$ for all priority classes $p \in \{1, 2, 3, 4\}$.

2> If a UE using a type 2 CAP (described in section 2.3.1.2.) successfully receives less than 10% of UL transport blocks (TBs) scheduled by the BS during a time period $t_0$ and $t_0 + T_{CO}$, the BS increments $CW_p$ for all priority classes to the next higher allowed value and remains in step 2. Otherwise, the BS goes to step 1.

$T_{CO}$ is calculated according to section 3.3.1.

If $CW_p = CW_{max,p}$ is used K times consecutively to generate $N_{init}$, only $CW_p$ for a priority class p for $CW_p = CW_{max,p}$ used K times consecutively to generate $N_{init}$ is reset to $CW_{min,p}$. the BS then selects K from a set of $\{1, 2, \ldots, 8\}$ values for each priority class $p \in \{1, 2, 3, 4\}$.

3.2.4. Energy Detection Threshold Adaptation Procedure

A BS accessing a carrier on which a LAA SCell transmission is performed sets an energy detection threshold $X_{Thresh}$ to a maximum energy detection threshold $X_{Thresh\_max}$ or less.

The maximum energy detection threshold $X_{Thresh\_max}$ is determined as follows.

If the absence of any other technology sharing the carrier may be guaranteed on a long term basis (e.g., by level of regulation), $$X_{Thresh\_max} = \min\begin{Bmatrix} T_{max} + 10 \text{ dB}, \\ X_r \end{Bmatrix}$$

where $X_r$ is the maximum energy detection threshold (in dBm) defined in regulatory requirements, when the regulation is defined. Otherwise, $X_r = T_{max} + 10$ dB.

Else, $$X_{Thresh\_max} = \max\begin{Bmatrix} -72 + 10 \cdot \log10(BWMHz/20 \text{ MHz})dBm, \\ \min\begin{Bmatrix} T_{max}, \\ T_{max} - T_A + (P_H + 10 \cdot \log10(BWMHz/20 \text{ MHz}) - P_{TX}) \end{Bmatrix} \end{Bmatrix}$$

Herein, each variable is defined as follows.

$T_A = 10$ dB for transmissions(s) including PDSCH;

$T_A = 5$ dB for transmissions including discovery signal transmission(s) and not including PDSCH;

$P_H = 23$ dBm;

$P_{TX}$ is the set maximum eNB output power in dBm for the carrier;

eNB uses the set maximum transmission power over a single carrier irrespective of whether single carrier or multi-carrier transmission is, employed $T_{max}$(dBm)=10·log 10(3.16228·10$^{-8}$(mW/MHz)
·BWMHz(MHz));

BWMHz is the single carrier bandwidth in MHz.

3.2.5. Channel Access Procedure for Transmission(S) on Multiple Carriers

The BS may access multiple carriers on which a LAA SCell transmission is performed in one of the following type A or type B procedures.

3.2.5.1. Type A Multi-Carrier Access Procedures

According to the procedure described in this section, the BS performs channel access on each carrier $c_i \in C$ where C is a set of intended carriers to be transmitted by the BS, $i=0, 1, \ldots q-1$, and q is the number of carriers to be transmitted by the BS.

The counter N described in section 3.2.1 (i.e., the counter N considered in the CAP) is determined for each carrier $c_i$, and in this case, the counter for each carrier is represented as $N_{c_i}$. $N_{c_i}$ is maintained according to section 3.2.5.1.1. or section 3.2.5.1.2.

3.2.5.1.1. Type A1

The counter N described in section 3.2.1 (i.e., the counter N considered in the CAP) is determined for each carrier $c_i$, and the counter for each carrier is represented as $N_{c_i}$.

In the case where the BS ceases a transmission on one carrier $c_j \in C$, if the absence of any other technology sharing the carrier may be guaranteed on a long term basis (e.g., by level of regulation), the BS may resume $N_{c_i}$ reduction, when an idle slot is detected after waiting for a duration of $4 \cdot T_{sl}$ or reinitializing $N_{c_i}$ for each carrier $c_i$ (where $c_i$ is different from $c_j$, $c_i \ne c_j$).

3.2.5.1.2. Type A2

The counter N for each carrier $c_j \in C$ may be determined according to section 2.2.1., and is denoted by $N_{c_j}$. Here, $c_j$ may mean a carrier having the largest $CW_p$ value. For each carrier $c_j$, $N_{c_i} = N_{c_j}$.

When the BS ceases a transmission on any one carrier for which $N_{c_i}$ has been determined by the BS, the BS reinitializes $N_{c_i}$ for all carriers.

3.2.5.2. Type B Multi-Carrier Access Procedure

A carrier $c_j \in C$ may be selected by the BS as follows.

The BS selects $c_j$ uniformly randomly from C before each transmission on multiple carriers $c_i \in C$, or The BS does not select $c_j$ more than once every one second.

Herein, C is a set of carriers to be transmitted by the BS, i=0, 1, . . . q−1, and q is the number of carriers to be transmitted by the BS.

For a transmission on a carrier $c_j$, the BS performs channel access on the carrier $c_j$ according to the procedure described in section 3.2.1 along with the modification described in section 3.2.5.2.1 or section 3.2.5.2.2.

For a transmission on the carrier $c_i \ne c_j$ among the carriers $c_i \in C$,

For each carrier $c_i$, the BS senses the carrier $c_i$ for at least a sensing interval $T_{mc}=25$ us immediately before the transmission on the carrier $c_i$. The BS may perform a transmission on the carrier $c_i$ immediately after sensing that the carrier $c_i$ is idle for at least the sensing interval $T_{mc}$. When the channel is sensed as idle during all time periods in which idle sensing is performed on the carrier $c_j$ within the given period $T_{mc}$, the carrier $c_i$ may be considered to be idle for $T_{mc}$.

The BS does not continuously perform transmissions on the carrier $c_i \ne c_j$ ($c_i \in C$) for a period exceeding $T_{mcot,p}$ as given in Table 6. $T_{mcot,p}$ is determined using the channel access parameter used for the carrier $c_j$.

3.2.5.2.1. Type B1

A single $CW_p$ value is maintained for the carrier set C.

To determine $CW_p$ for channel access on a carrier $c_j$, step 2 in the procedure described in section 3.2.3. is modified as follows.

If at least 80% (Z=80%) of HARQ-ACK values corresponding to PDSCH transmission(s) in reference subframe k of all carriers $c_i \in C$ are determined to be NACK, then $CW_p$ for all priority classes $p \in \{1, 2, 3, 4\}$ is incremented to the next higher allowed value. Otherwise, the procedure goes to step 1.

3.2.5.2.2. Type B2 (Type B2)

The $CW_p$ value is maintained independently for each carrier $c_i \in C$ by using the procedure described in section 3.2.3. To determine $N_{init}$ for the carrier $c_j$, the $CW_p$ value of the carrier $c_{j1} \in C$ is used. Here, $c_{j1}$ is a carrier having the largest $CW_p$ among all carriers in the set C.

3.3. Uplink Channel Access Procedures

The UE and the BS that schedules a UL transmission for the UE perform the following procedure for access to a channel in which LAA SCell transmission(s) is performed. On the assumption that the UE and the BS are basically configured with a PCell that is a licensed band and one or more SCells which are U-bands, a UL CAP operation applicable to the present disclosure will be described below in detail, with the U-bands represented as LAA SCells. The UL CAP operation may be applied in the same manner even when only a U-band is configured for the UE and the BS.

3.3.1. Channel Access Procedure for Uplink Transmission(s)

The UE may access a carrier on which LAA SCell UL transmission(s) are performed according to a type 1 or type 2 UL CAP. The type 1 CAP is described in section 3.3.1.1, and the type 2 CAP is described in section 3.3.1.2.

If a UL grant that schedules a PUSCH transmission indicates the type 1 CAP, the UE performs type 1 channel access to perform a transmission including the PUSCH transmission, unless otherwise stated in this section.

If the UL grant that schedules the PUSCH transmission indicates the type 2 CAP, the UE performs type 2 channel access to perform a transmission including the PUSCH transmission, unless otherwise stated in this section.

The UE performs type 1 channel access for an SRS transmission that does not include a PUSCH transmission. A UL channel access priority class p=1 is used for the SRS transmission that does not include a PUSCH.

TABLE 9

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

When the 'UL configuration for LAA' field configures 'UL offset' l and 'UL duration' d for subframe n, If the end of a UE transmission occurs in or before subframe n+l+d−1, the UE may use the type 2 CAP for transmission in subframe n+l+i (where i=0, 1 . . . d−1).

If the UE is scheduled to perform a transmission including a PUSCH in a subframe set $n_0, n_1, \ldots, n_{w-1}$ by using PDCCH DCI format 0B/4B, and the UE may not perform channel access for transmission in subframe $n_k$, the UE should attempt to make a transmission in subframe $n_{k+1}$ according to a channel access type indicated by DCI. k∈{0, 1, . . . w−2} and w is the number of scheduled subframes indicated by the DCI.

If the UE is scheduled to perform a transmission including a PUSCH without gaps in the subframe set $n_0, n_1, \ldots, n_{w-1}$ by using one or more of PDCCH DCI formats 0A/0B/4A/4B, and performs a transmission in subframe $n_k$ after accessing a carrier according to the type 1 or type 2 CAP, the UE may continue the transmission in a subframe after $n_k$ where k∈{0, 1, . . . w−1}.

If the start of the UE transmission in subframe n+1 immediately follows the end of the UE transmission in subframe n, the UE does not expect that a different channel access type will be indicated for the transmission in the subframe.

If the UE is scheduled to perform a transmission without gaps by using one or more of PDCCH DCI formats 0A/0B/4A/4B, stops the transmission during or before subframe $n_{k1}$ (where k1 $\in\{0, 1, \ldots w-2\}$), and continuously senses the corresponding channel as idle after stopping the transmission, the UE may perform the transmission in the type 2 CAP after subframe $n_{k2}$ (where k2 $\in\{1, \ldots w-1\}$). If the channel is not sensed continuously as idle by the UE after the UE stops the transmission, the UE may perform the transmission in the type 1 CAP of a UL channel access priority class indicated by DCI corresponding to subframe $n_{k2}$ after subframe $n_{k2}$ (where k2 $\in\{1, \ldots w-1\}$).

If the UE receives a UL grant, DCI indicates the UE to start a PUSCH transmission in subframe n by using the type 1 CAP, and the UE has an ongoing type 1 CAP before subframe n,

- If a UL channel access priority class value p1 used for the ongoing type 1 CAP is equal to or greater than a UL channel access priority class value p2 indicated by the DCI, the UE may perform the PUSCH transmission by accessing a carrier in the ongoing type 1 CAP.
- If the UL channel access priority class value p1 used for the ongoing type 1 CAP is less than the UL channel access priority class value p2 indicated by the DCI, the UE terminates the ongoing type 1 CAP.

If the UE is scheduled to transmit on a carrier set C in subframe n, a UL grant scheduling a PUSCH transmission on the carrier set C indicates the type 1 CAP, the same 'PUSCH starting position' is indicated for all carriers of the carrier set C, and the carrier frequencies of the carrier set C are a subset of a preset carrier frequency set,

- The UE may perform a transmission on a carrier $c_i \in C$ in the type 2 CAP.
  - If the type 2 CAP has been performed on the carrier $c_i$ immediately before the UE transmission on a carrier $c_j \in C$, and
  - If the UE has accessed the carrier $c_j$ by using the type 1 CAP,
  - Before performing the type 1 CAP on any one carrier in the carrier set C, the UE uniformly randomly selects the carrier $c_j$ from the carrier set C.

When the BS has transmitted on the carrier according to the CAP described in section 3.2.1, the BS may indicate the type 2 CAP by DCI in a UL grant that schedules a transmission including a PUSCH on the carrier in subframe n.

Alternatively, when the BS has transmitted on the carrier according to the CAP described in section 3.2.1, the BS may indicate that the type 2 CAP is available for the transmission including the PUSCH on the carrier in subframe n by the 'UL Configuration for LAA' field.

Alternatively, when subframe n occurs within a time period starting from $t_0$ and ending at $t_0+T_{CO}$, the BS may schedule the transmission including the PUSCH on the carrier within subframe n following a transmission of a duration $T_{short\_ul}$=25 us from the BS. $T_{CO}=T_{mcot,p}=T_g$ and each variable may be defined as follows.

- $t_0$: a time instant at which the BS starts a transmission.
- $T_{mcot,p}$: determined by the BS according to section 3.2.
- $T_g$: the total period of all gap periods exceeding 25 us occurring between a DL transmission of the BS starting from to and a UL transmission scheduled by the BS and between two UL transmissions scheduled by the BS.

If the UL transmissions are scheduled in succession, the BS schedules the UL transmissions between consecutive subframes in $t_0$ and $t_0+T_{CO}$.

For the UL transmission on the carrier following the transmission of the BS on the carrier within the duration $T_{short\_ul}$=25 us, the UE may perform the type 2 CAP for the UL transmission.

If the BS indicates the type 2 CAP for the UE by DCI, the BS indicates a channel access priority class used to obtain access to the channel in the DCI.

3.3.1.1. Type 1 UL Channel Access Procedure

After sensing that the channel is idle for a slot duration of a defer duration $T_d$ and the counter N becomes 0 in step 4, the UE may perform a transmission using the type 1 CAP. The counter N is adjusted by sensing the channel for additional slot duration(s) according to the following procedure.

1) Set N=$N_{init}$ where $N_{init}$ is a random number uniformly distributed between 0 and $CW_p$, and go to step 4.
2) If N>0 and the BS chooses to decrement the counter, set N=N−1.
3) Sense the channel for an additional slot duration, and if the additional slot duration is idle, go to step 4. Else, go to step 5.
4) If N=0, stop. Else, go to step 2.
5) Sense the channel during all slot durations of an additional defer duration $T_d$.
6) If the channel is sensed as idle during the slot durations of the additional defer duration $T_d$, go to step 4. Else, go to step 5.

The above-described type 1 UL CAP of the UE may be summarized as follows.

For a UL transmission, a transmission node (e.g., a UE) may initiate the CAP to operate in LAA SCell(s) which is a U-band cell (S1610).

The UE may randomly select a backoff counter N within a CW according to step 1. N is set to an initial value $N_{init}$ (S1620). $N_{init}$ is a value selected randomly from among the values between 0 and $CW_p$.

Subsequently, if the backoff counter value N is 0 according to step 4 (Y in S1630), the UE ends the CAP (S1632). Subsequently, the UE may perform a Tx burst transmission (S1634). On the other hand, if the backoff counter value is not 0 (N in S1630), the UE decrements the backoff counter value by 1 according to step 2 (S1640).

Subsequently, the UE checks whether the channel of the LAA SCell(s) is idle (S1650). If the channel is idle (Y in S1650), the UE checks whether the backoff counter value is 0 (S1630).

On the contrary, if the channel is not idle in step S1650, that is, the channel is busy (N in S1650), the UE checks whether the channel is idle for a defer duration $T_d$ (25 usec or more) longer than a slot time (e.g., 9 usec) according to step 5 (S1660). If the channel is idle for the defer duration (Y in S1670), the UE may resume the CAP.

For example, if the backoff counter value $N_{init}$ is 10 and the channel is determined to be busy after the backoff counter value is decremented to 5, the UE determines whether the channel is idle by sensing the channel for the defer duration. In this case, if the channel is idle for the defer duration, the UE may perform the CAP again from the backoff counter value 5 (or from the backoff counter value 4 after decrementing the backoff counter value by 1), instead of setting the backoff counter value $N_{init}$.

On the other hand, if the channel is busy for the defer duration (N in S1670), the UE re-performs S1660 to check again whether the channel is idle for a new defer duration.

In the above procedure, if the UE does not perform the transmission including the PUSCH on the carrier in which LAA SCell transmission(s) is performed after step 4 of the afore-described procedure, the UE may perform the transmission including the PUSCH on the carrier, when the following conditions are satisfied:

When the UE is prepared to transmit the transmission including the PUSCH and the channel is sensed as idle during at least the slot duration $T_{sl}$; and When the channel is sensed as idle during all slot durations of the defer duration $T_d$ immediately before the transmission including the PUSCH.

On the contrary, when the UE senses the channel for the first time after being prepared for the transmission, if the channel is not sensed as idle during the slot duration $T_{sl}$, or during any of all slot durations of the defer duration $T_d$ immediately before the intended transmission including the PUSCH, the UE proceeds to step 1 after sensing the channel as idle during the slot durations of the defer duration $T_d$.

The defer duration $T_d$ includes a duration of $T_f (=16$ us) immediately followed by $m_p$ consecutive slot durations where each slot duration $T_{sl}$ is 9 us, and $T_f$ includes an idle slot duration $T_{sl}$ at the start of $T_f$.

If the UE senses the channel during the slot duration $T_{sl}$ and power measured by the UE for at least 4 us in the slot duration is less than an energy detection threshold $X_{Thresh}$, the slot duration $T_{sl}$ is considered to be idle. Otherwise, the slot duration $T_{sl}$ is considered to be busy.

$CW_{min,p} \le CW_p \le CW_{max,p}$ represents a contention window, and $CW_p$ adjustment is described in detail in section 3.3.2.

$CW_{min,p}$ and $CW_{max,p}$ are chosen before step 1 of the above procedure.

$m_p$, $CW_{min,p}$, and $CW_{max,p}$ are determined based on a channel access priority class signaled to the UE (see Table 9).

$X_{Thresh}$ is adjusted according to section 3.3.3.

3.3.1.2. Type 2 UL Channel Access Procedure

If the UE uses the type 2 CAP for a transmission including a PUSCH, the UE may perform the transmission including the PUSCH immediately after sensing a channel as idle for at least a sensing duration $T_{short\_ul}=25$ us. $T_{short\_ul}$ includes a duration of $T_f(=16$ us) immediately followed by one slot duration $T_{sl}(=9$ us). $T_f$ includes an idle slot duration $T_{sl}$ at the start of $T_f$. If the channel is sensed as idle during the slot duration $T_{short\_ul}$, the channel is considered to be idle for $T_{short\_ul}$.

3.3.2. Contention Window Adjustment Procedure

If the UE performs a transmission using the type 1 CAP associated with a channel access priority class p on a carrier, the UE maintains and adjusts a contention window value $CW_p$ using the following procedures before step 1 of the procedure described in section 2.3.1.1. for the transmission (i.e., before performing the CAP):

When a new data indicator (NDI) for at least one HARQ process related to HARQ_ID_ref is toggled, Set $CW_p=CW_{min,p}$ for all priority classes $p \in \{1, 2, 3, 4\}$.

Else, increment $CW_p$ to the next higher allowed value for all priority classes $p \in \{1, 2, 3, 4\}$.

HARQ_ID_ref is the HARQ process ID of a UL-SCH in reference subframe $n_{ref}$. Reference subframe $n_{ref}$ is determined as follows.

When the UE receives a UL grant in subframe $n_g$. Here, subframe $n_w$ is the most recent subframe before subframe $n_g-3$ in which the UE transmits the UL-SCH using the type 1 CAP.

If the UE performs a transmission including a UL-SCH without gaps, starting from subframe $n_0$ in a subframe $n_0, n_1, \ldots, n_w$, reference subframe $n_{ref}$ is subframe $n_0$.

Else, reference subframe $n_{ref}$ is subframe $n_w$.

If the UE is scheduled to perform a transmission including a PUSCH without gaps in a subframe set $n_0, n_1, \ldots, n_{w-1}$ and may not perform any transmission including the PUSCH in the subframe set, the UE may maintain $CW_p$ for all priority classes $p \in \{1, 2, 3, 4\}$ without changing $CW_p$.

If a reference subframe for the recent scheduled transmission is also subframe $n_{ref}$, the UE may maintain $CW_p$ for all priority classes $p \in \{1, 2, 3, 4\}$ equal to $CW_p$ for a transmission including a PUSCH, which uses the recent scheduled type 1 CAP.

If $CW_p=CW_{max,p}$ the next higher allowed value for the $CW_p$ adjustment is $CW_{max,p}$.

If $CW_p=CW_{max,p}$ is used K times consecutively to generate $N_{init}$, only $CW_p$ for a priority class p for $CW_p=CW_{max,p}$ used K times consecutively to generate $N_{init}$ is reset to $CW_{min,p}$. K is then selected by the UE from a set of $\{1, 2, \ldots, 8\}$ values for each priority class $p \in \{1, 2, 3, 4\}$.

3.3.3. Energy Detection Threshold Adaptation Procedure)

A UE accessing a carrier on which a LAA SCell transmission is performed sets an energy detection threshold $X_{Thresh}$ to a maximum energy detection threshold $X_{Thresh\_max}$ or less.

The maximum energy detection threshold $X_{Thresh\_max}$ is determined as follows.

If the UE is configured with a higher-layer parameter 'maxEnergyDetectionThreshold-r14', $X_{Thresh\_max}$ is set equal to a value signaled by the higher-layer parameter.

Else,

The UE determines $X'_{Thresh\_max}$ according to the procedure described in section 3.3.3.1.

If the UE is configured with a higher-layer parameter maxEnergyDetectionThresholdOffset-r14', $X_{Thresh\_max}$ is set to $X'_{Thresh\_max}$ adjusted according to an offset value signaled by the higher-layer parameter.

Else,

The UE sets $X_{Thresh\_max}=X'_{Thresh\_max}$.

3.3.3.1. Default Maximum Energy Detection Threshold Computation Procedure

If a higher-layer parameter 'ab senceOfAnyOtherTechnology-r14' indicates TRUE:

$$X'_{Thresh\_max} = \min \left\{ \begin{array}{l} T_{max} + 10 \text{ dB}, \\ X_r \end{array} \right\}$$

where $X_r$ is a maximum energy detection threshold (in dBm) defined in regulatory requirements when the regulation is defined. Else $X_r=T_{max}+10$ dB.

Else:

$$X'_{Thresh\_max} = \max\left\{\begin{array}{l} -72 + 10 \cdot \log10(BWMHz/20 \text{ MHz})dBm, \\ \min\left\{\begin{array}{l} T_{max}, \\ T_{\max} - T_A + (P_H + 10 \cdot \log10(BWMHz/20 \text{ MHz}) - P_{TX}) \end{array}\right\} \end{array}\right\}$$

Here, each variable is defined as follows.
$T_A$=10 dB
$P_H$=23 dBm;
$P_{TX}$ is the set to the value of as defined in 3GPP TS 36.101.

$T_{max}$(dBm)=10·log 10(0.1622.8·10$^{-8}$(mW/MHz) ·BWMHz(MHz))

BWMHz is the single carrier bandwidth in MHz.

3.4. Subframe/Slot Structure Applicable to Unlicensed Band System

Figure 17:
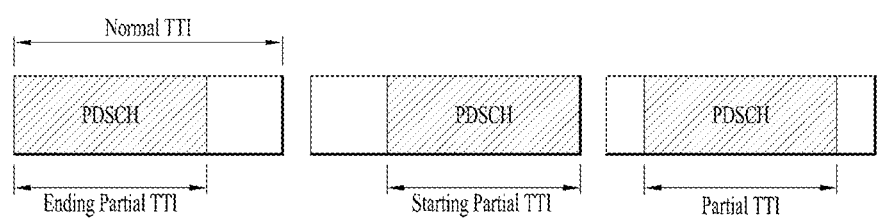
FIG. 17 is a diagram illustrating a partial TTI or a partial subframe applicable to the present disclosure.

FIG. 17 is a diagram illustrating a partial TTI or a partial subframe/slot applicable to the present disclosure.

In the Release-13 LAA system, a partial TTI is defined as a DwPTS to maximize use of MCOT and support continuous transmission in a DL burst transmission. The partial TTI (or partial subframe) refers to a period in which a PDSCH signal is transmitted for a length smaller than a legacy TTI (e.g., 1 ms).

In the present disclosure, a starting partial TTI or a starting partial subframe/slot refers to a form in which some front symbols of a subframe are emptied, and an ending partial TTI or ending partial subframe/slot refers to a form in which some symbols at the end of a subframe are emptied. (On the other hand, a whole TTI is called a normal TTI or a full TTI.)

FIG. 17 illustrates various forms of the above-described partial TTI. The first drawing of FIG. 17 illustrates the ending partial TTI (or subframe/slot), and the second drawing of FIG. 17 illustrates the starting partial TTI (or subframe/slot). In addition, the third drawing of FIG. 17 illustrates a partial TTI (or subframe/slot) configured by emptying some symbols at the start and end of the subframe/slot. In this case, a time interval excluding signal transmission in a normal TTI is called a transmission gap (Tx gap).

While FIG. 17 has been described in the context of a DL operation, the same thing may be applied to a UL operation. For example, the partial TTI structures illustrated in FIG. 16 may also be applied to PUCCH and/or PUSCH transmission.

4. PROPOSED EMBODIMENTS

Hereinafter, the configurations according to the present disclosure will be described in detail based on the above-described technical features.

Cellular communication system such as the LTE/NR system to which the present disclosure is applicable support use of a U-band of 2.4 GHz, which is commonly used in the conventional Wi-Fi system, or a U-band of 5 or 60 GHz in traffic offloading.

Due to the characteristics of a U-band, each communication node needs to perform channel sensing before transmitting a signal to check whether other communication nodes perform signal transmission in the corresponding U-band. Such operation may be referred to as listen before talk (LBT) or a channel access procedure (CAP). That is, a BS or a UE needs to perform the LBT or CAP to transmit a signal in a U-band. In addition, when the BS or UE performs signal transmission as described above, other communication nodes such as a Wi-Fi node, etc. also need to perform the LBT or CAP to avoid causing interference to the BS or UE.

In the NR system to which the present disclosure is applicable, a BS or a UE may transmit and receive beamformed signals using multiple antennas (in particular, in a mmWave band). In this case, a transmitting side may perform beam sweeping on analog beams capable of covering some of the whole cell coverage over multiple TUs so that the transmitting side may transmit a signal capable of covering the whole cell coverage.

In the present disclosure, a wireless communication system supporting a U-band may mean both that the wireless communication system supports one or more U-bands only or that the wireless communication system supports one L-band and one or more U-bands. Thus, a U-band according to the present disclosure may act as a PCell or an SCell in a wireless communication system to which the present disclosure is applicable.

Herein, a signal continuously transmitted in the time domain with no gap in a U-band is referred to as a transmission (Tx) burst. The present disclosure describes a method of transmitting and receiving an initial signal for informing transmission of a Tx burst between a transmitting side and a receiving side (particularly, when the transmitting and receiving sides are a BS and a UE, respectively) and a method of monitoring a PDCCH based on the initial signal.

4.1. Initial Signal Transmission and Reception Method 4.1.1. Purpose of Initial Signal Transmission In an L-band (or licensed carrier), periodicity may be guaranteed at least for a signal/channel that needs to be periodically transmitted such as a reference signal for measurement. However, in a U-band (or unlicensed carrier), if a transmitting side fails in a CAP (or LBT), the transmitting side may not attempt signal transmission. Thus, a signal for informing whether there is a signal to be transmitted in the U-band may be required. In particular, since the NR system has no steadily transmitted signals such as a cell-specific reference signal (CRS) compared to the LTE system, the following signals proposed in the present disclosure may be necessary.

In the present disclosure, a signal for informing that a transmitting side will perform signal transmission (or is performing signal transmission) in a U-band is referred to as an initial signal. In some embodiments, such a signal may be referred to as a notification signal, etc.

The initial signal may be transmitted in the front part of a Tx burst or in each specific TU (e.g., at each slot boundary) of the Tx burst.

Such an initial signal may be transmitted not only for the purpose of informing that a transmitting side transmits a signal in a U-band based on a CAP but also for the following purposes.

Tx beam identification: A receiving side may recognize whether a transmitting side transmits a Tx burst and which Tx beam the transmitting side uses, based on an initial signal transmitted from the transmitting side.

Automatic gain control (AGC) gain setting: A receiving side may perform AGC gain setting for receiving a Tx burst, which is transmitted after transmission of an initial signal, based on the initial signal.

(Coarse or fine) Time and/or frequency synchronization: An initial signal may be used to obtain accurate time/frequency synchronization or frame/subframe/slot/symbol boundaries for a periodically transmitted signal (e.g., a signal for radio resource management (RRM) measurement, a signal for channel state information (CSI) measurement, etc.). Alternatively, a specific node may attempt to detect an initial signal without performing a fast Fourier transform (FFT) for received signals but perform the FFT only when the initial signal is detected. By doing so, the specific node may have an advantage in power saving.

Notification of neighbor cells/other operators/other RATs: According to the present disclosure, a receiving side belonging to a neighbor cell/another operator/another RAT may detect an initial signal of a wireless communication system such as the NR system by performing an FFT without consideration of the numerology supported in the wireless communication system. Specifically, when a DL initial signal is configured as in the following fifth DL initial signal transmission and reception method, a receiving side may detect the initial signal by correlating received signals in the time domain (for example, when an initial signal is repeated every X usec, the receiving side may receive a signal with a length of X usec, store the signal in a buffer, correlate the signal with a next signal with the same length, and recognize/know from the repeatedly transmitted initial signal whether there is a DL Tx burst). This may be advantageous in coexistence with neighbor cells/other operators/other RATs.

4.1.2. Initial Signal Transmission and Reception Method for DL Signal Transmission In this section, a description will be given of signal transmission and reception methods using, as an initial signal for DL signal transmission, a system synchronization signal or a signal modified based thereon, a demodulation reference signal (DM-RS) related to a broadcast channel or a signal/channel modified based thereon, a DM-RS related to a PDCCH or a signal/channel modified based thereon, a channel state information reference signal (CSI-RS) or a signal modified based thereon, a signal in a DL Tx burst or a signal modified based thereon, etc. In this case, such an initial signal may be transmitted from a BS that performs (or succeeds in) the DL CAP proposed in the present disclosure.

4.1.2.1. First DL Initial Signal Transmission and Reception Method: Modification of PSS and/or SSS for Use of Initial Signal In the NR system to which the present disclosure is applicable, a PSS/SSS includes 12 RBs (and more particularly, the PSS/SSS is configured with a 127-length sequence) and has the same sequence for each beam. Considering regulations related to the power spectral density (PSD) in U-bands, more power may be assigned by spreading and transmitting a signal in the frequency domain. Thus, an initial signal may be defined by performing RB (RE, RE-group, or RB-group) interlacing on the PSS/SSS, repeating the PSS/SSS in the frequency domain, or increasing the length of the PSS/SSS sequence. Here, the RB (RE, RE-group, or RB-group) interlacing may refer to an operation of configuring one cluster on an RB (RE, RE-group, or RB-group) basis and spreading a signal in the frequency domain by applying a predetermined frequency-domain interval to each cluster.

In particular, when a Tx beam applied to a Tx burst is capable of being identified based on the initial signal, the initial signal may be defined based on a difference sequence for each beam.

For example, the initial signal applicable to the present disclosure may be defined by changing a PSS/SSS sequence formula defined in the LTE or NR system to a function of beam indices (e.g., "cell index+beam index" is used instead of the cell index).

As another example, the initial signal applicable to the present disclosure may be defined by determining the starting PRB (or RE) index of the PSS/SSS defined in the LTE or NR system as a function of beam indices (e.g., starting PRB index=X+beam index, where X may be predefined or signaled by higher layer signaling (e.g., RRC, DCI, etc.)).

As a further example, the initial signal applicable to the present disclosure may be defined by determining the starting PRB (or RE) index of the PSS/SSS defined in the LTE or NR system as a function of beam indices and/or cell indices (e.g., starting PRB index=X+beam index+mod (cell index, 4), where X may be predefined or signaled by higher layer signaling (e.g., RRC, DCI, etc.)) in consideration of interference between serving and neighbor cells.

For distinction between the initial signal and the PSS/SSS for synchronization in the serving cell, the initial signal may be transmitted in a frequency region different from that for the PSS/SSS (that is, the initial signal may not be transmitted in a synchronization raster).

Additionally, the initial signal applicable to the present disclosure may be defined by multiplexing of the PSS and SSS in the time and/or frequency domain after applying the above-described method to the PSS and SSS.

4.1.2.2. Second DL Initial Signal Transmission and Reception Method: Modification of PBCH DM-RS for Use of Initial Signal In the NR system to which the present disclosure is applicable, a PBCH DM-RS may include up to 20 RBs and have a different sequence for each beam (a total of 8 sequences are defined).

As described above, considering the regulations related to the power spectral density (PSD) in U-bands, more power may be assigned by spreading and transmitting a signal in the frequency domain. Thus, an initial signal may be defined by performing RB (RE or RB-group) interlacing on the PBCH DM-RS composed of 20 RBs, repeating the PBCH DM-RS in the frequency domain, or increasing the length of the PBCH DM-RS sequence.

In particular, when a Tx beam applied to a Tx burst is capable of being identified based on the initial signal, the initial signal may be defined based on a difference sequence for each beam. When a transmitting side transmits the initial signal using 9 or more beams, the initial signal transmitted on each beam may be defined as follows.

For example, the initial signal applicable to the present disclosure may be defined by determining the starting PRB (or RE) index of the PBCH DM-RS defined in the LTE or NR system as a function of beam indices (e.g., starting PRB index=X+beam index/8, where X may be predefined or signaled by higher layer signaling (e.g., RRC, DCI, etc.)).

As another example, the initial signal applicable to the present disclosure may be defined by determining the starting PRB (or RE) index of the PBCH DM-RS defined in the LTE or NR system as a function of beam indices and/or cell indices (e.g., starting PRB index=X+beam index/8+mod (cell index, 4), where X may be predefined or signaled by higher layer signaling (e.g., RRC, DCI, etc.)) in consideration of interference between serving and neighbor cells.

For distinction between the initial signal and the PBCH DM-RS for synchronization in the serving cell, the initial signal may be transmitted in a frequency region different from that for the PBCH DM-RS (that is, the initial signal may not be transmitted in a synchronization raster).

Additionally, the initial signal applicable to the present disclosure may be defined by multiplexing of a plurality of PBCH DM-RSs in the time and/or frequency domain after applying the above-described method to the PBCH DM-RSs.

4.1.2.3. Third DL Initial Signal Transmission and Reception Method: Modification of PDCCH DM-RS for Use of Initial Signal In the NR system to which the present disclosure is applicable, when the precoder granularity of a PDCCH is set as consecutive RBs in the frequency domain in a CORESET configuration (regardless of resource element group (REG) bundle sizes), if transmission is performed in one REG among the consecutive RBs, a PDCCH DM-RS may be transmitted in all of the consecutive RBs.

In the present disclosure, the PDCCH DM-RS may be used as an initial signal.

Alternatively, the PDCCH DM-RS and the PDCCH corresponding thereto may be used as the initial signal (or a channel used as the initial signal).

Specifically, a UE may decode the PDCCH by detecting the PDCCH DM-RS defined as the initial signal in a specific CORESET configuration (or a search space set configuration associated with the corresponding CORESET). In this case, if a cyclic redundancy check (CRC) is successful, the UE may recognize that a DL Tx burst is transmitted in a corresponding slot.

In this configuration, a group common PDCCH including slot format indicator (SFI) information may be used as the PDCCH. The SFI information may include information on a channel occupancy time (COT) occupied by a BS, information on the configurations of DL/UL/flexible/reserved symbols in the COT, etc.

The CORESET may be configured in at least M RBs (e.g., M=50) or a frequency band of W MHz or higher (e.g., W=10) in consideration of the transmission power of the initial signal.

In this case, the CORESET may include only one (OFDM) symbol to minimize occupancy in the time domain. In the following description, a symbol may be referred to as an OFDM symbol.

Additionally, for AGC gain setting for Tx burst reception, a DM-RS may be transmitted without (or with) a PDCCH in K symbols (e.g., K=1) before the PDCCH is transmitted (or before L symbols from the time when the PDCCH is transmitted). In this case, the DM-RS transmitted together with the PDCCH (e.g., the DM-RS transmitted when the PDCCH is transmitted) may not be defined as the initial signal.

Additionally, the initial signal applicable to the present disclosure may be defined by multiplexing of multiple PDCCH DM-RSs in the time and/or frequency domain after applying the above-described method to the PDCCH DM-RSs.

In the present disclosure, a CORESET configuration may include a time/frequency resource region in which a PDCCH may be transmitted, information on whether interleaving is applied, precoder granularity, an REG bundle size, a QCL relationship between SSBs or RSs, etc. A search space configuration may include a CORESET index, the number of PDCCH blind decoding (BD) candidates per aggregation level, information on a PDCCH monitoring periodicity/offset/occasion, etc.

4.1.2.4. Fourth DL Initial Signal Transmission and Reception Method: Use of Cell-Specific CSI-RS as Initial Signal In the NR system to which the present disclosure is applicable, a CSI-RS may be transmitted and received based on sequence information configured in a resource region, which is configured by a UE-specific RRC configuration. In this case, a cell-specific CSI-RS may be defined separately under consideration of an idle-state UE that needs to receive an initial signal with no separate RRC configuration. Alternatively, the cell-specific CSI-RS may be defined separately by the resource and sequence information of the CSI-RS, which is determined based on a function of cell IDs and beam IDs.

The cell-specific CSI-RS may be used as the initial signal.

4.1.2.5. Fifth DL Initial Signal Transmission and Reception Method: Repeated Transmission of CP of Symbol in DL Tx Burst or Part Thereof as Initial Signal A BS may transmit, as an initial signal, a CP of the first symbol in a DL Tx burst or a part of the corresponding CP. Upon receiving the initial signal, a UE may obtain time synchronization based on the repeated pattern of the initial signal. Then, the UE may achieve fine time/frequency synchronization for channels/signals in the following DL Tx burst.

Specifically, when the subcarrier spacing is 15 kHz, the CP length may be set to 144 $T\_s$ or 160 $T\_s$ (where $T\_s=1/2048/15$ k sec). The BS may transmit the DL Tx burst after transmitting a signal shorter than or equal to 144 $T\_s$ (or 160 $T\_s$) N times. In this case, the value of N (or the minimum and/or maximum value of N) may be predefined or configured by RRC signaling.

Alternatively, when a signal shorter than 144 $T\_s$ (or 160 $T\_s$) is used (for example, P $T\_s$, where P<144 or 160), the most preceding signal in time among CP signals with the length of 144 $T\_s$ (or 160 $T\_s$) may be defined as the initial signal. In this case, the value of P (or the minimum and/or maximum value of P) may be predefined or configured by RRC signaling.

In this case, since the CP transmitted immediately after the initial signal is repeatedly transmitted N times may be equivalent to (or include) the initial signal although the number of times that the initial signal is actually repeated is N, the same effect as if the initial signal is repeated N+1 times may be obtained.

Further, the BS may map specific additional information (e.g., signature information, etc.) to the initial signal and then transmit the initial signal to the UE. To this end, the BS may multiply a specific orthogonal cover code to the initial signal in the time domain and then transmit the initial signal to the UE. For example, when the BS applies a length-N cover code to the initial signal (or repeatedly applies a length-N/K cover code K times), information corresponding to each cover code applied to the initial signal may be used to identify an operator, a beam ID, an indicator indicating a UE (group) that needs to receive the following DL Tx burst, etc.

The initial signal according to the above-described embodiments may be transmitted before the DL Tx burst including DL signals/channels to be received by idle-mode UEs (and/or an inactive-state UEs). In other words, the BS may transmit the initial signal before the DL Tx burst including the DL signals/channels.

For example, the BS may transmit the initial signal before transmitting the DL Tx burst including PDCCHs/PDSCHs associated with paging information that the idle-mode UEs (and/or an inactive-state UEs) need to read after wake-up. In this case, since the signal transmission is performed in a U-band, the BS may perform a DL CAP for the DL Tx burst transmission and transmit the DL Tx burst when the DL CAP is successful.

Thus, when UEs are configured/instructed to read the paging information, the UEs may expect to receive the DL Tx burst including the PDCCHs/PDSCHs associated with the paging information upon receiving the initial signal. While receiving the initial signal, the UEs may obtain time synchronization.

Alternatively, the idle-mode UEs (and/or an inactive-state UEs) may require a predetermined time (e.g., a processing (or warm-up) time) for next signal reception after receiving the initial signal. Thus, the initial signal may be transmitted the predetermined time before the start of the DL Tx burst including the DL signals/channels to be received by the idle-mode UEs (and/or an inactive-state UEs) rather than immediately before the start of the DL Tx burst. In this case, the predetermined time may be predefined or configured by RRC signaling.

4.1.3. Initial Signal Transmission and Reception Method for UL Signal Transmission In this section, initial signal transmission and reception methods will be described in detail from the perspective of UL signal transmission. When a UE attempts UL signal transmission according to UL grant-based scheduling from a BS, the UE may be assigned UE Tx beams from the BS.

However, since it may be difficult for the BS to anticipate UL CAP results of the UE, the following operation may be allowed. That is, the BS may indicate a predetermined number of UE Tx beam candidates to the UE through a UL grant (L1 signaling such as a group common PDCCH, higher layer signaling such as RRC signaling, etc.), and the UE may perform transmission by selecting a Tx beam based on the UL CAP results.

Hereinafter, a description will be given of UL initial signal transmission and reception methods applicable when UL transmission is performed in U-bands.

4.1.3.1. First UL Initial Signal Transmission and Reception Method: Distinction Between UE Tx Beams Based on UL DM-RS (or Sounding Reference Signal (SRS)) Sequences When a BS informs a UE of UE Tx beam candidates through a UL grant (L1 signaling such as a group common PDCCH, higher layer signaling such as RRC signaling, etc.) (for example, when the BS signals Tx beam #0 and Tx beam #1 to the UE), the UE may transmit an initial signal based on a UL DM-RS (or SRS) sequence corresponding to the index of a Tx beam used for UL transmission after succeeding in a UL CAP. In this case, the UL DM-RS (or SRS) sequence may be generated by a function of Tx beam indices (e.g., Tx cyclic shift index=indicated index+Tx beam index).

4.1.3.2. Second UL Initial Signal Transmission and Reception Method: Distinction Between UE Tx Beams Based on Frequency Indices of UL DM-RS (or SRS) Sequences When a BS informs a UE of UE Tx beam candidates through a UL grant (L1 signaling such as a group common PDCCH, higher layer signaling such as RRC signaling, etc.) (for example, when the BS signals Tx beam #0 and Tx beam #1 to the UE), the UE may transmit an initial signal based on a UL DM-RS (or SRS) sequence on a frequency index (or port number) corresponding to the index of a Tx beam used for UL transmission after succeeding in a UL CAP.

For example, when the UE uses Tx beam #0 for the UL transmission after succeeding in the UL CAP, the UE may transmit the initial signal (e.g., UL DM-RS, SRS, etc.) in REs with even indices. When the UE uses Tx beam #1 for the UL transmission after succeeding in the UL CAP, the UE may transmit the initial signal (e.g., UL DM-RS, SRS, etc.) in REs with odd indices.

Alternatively, although the UE may transmit the initial signal on frequency resources (e.g., even-indexed REs) corresponding to Tx beam #0 and all frequency resources (e.g., odd-indexed REs) corresponding to Tx beam #1 after succeeding in the UL CAP regardless of whether the Tx beam used for the UL transmission is Tx beam #0 or Tx beam #1, the UE may inform the BS of the index of a Tx beam actually used for the transmission by changing the sequence of the initial signal.

4.1.3.3. Third UL Initial Signal Transmission and Reception Method: Distinction Between UE Tx Beams Based on Time Resources for Transmitting UL DM-RS (or SRS) Sequences When a BS informs a UE of UE Tx beam candidates through a UL grant (L1 signaling such as a group common PDCCH, higher layer signaling such as RRC signaling, etc.) (for example, when the BS signals Tx beam #0 and Tx beam #1 to the UE), the UE may transmit an initial signal based on a UL DM-RS (or SRS) sequence on a time resource (e.g., symbol index) corresponding to the index of a Tx beam used for UL transmission after succeeding in a UL CAP.

For example, when the UE uses Tx beam #0 for the UL transmission after succeeding in the UL CAP, the UE may transmit the initial signal (e.g., UL DM-RS, SRS, etc.) in symbol #0 in a corresponding slot. When the UE uses Tx beam #1 for the UL transmission after succeeding in the UL CAP, the UE may transmit the initial signal (e.g., UL DM-RS, SRS, etc.) in symbol #1 in the corresponding slot.

Alternatively, although the UE may transmit the initial signal on time resources (e.g., symbol #0 in the slot) corresponding to Tx beam #0 and all (or some available) resources (e.g., symbol #1 in the slot) corresponding to Tx beam #1 after succeeding in the UL CAP regardless of whether the Tx beam used for the UL transmission is Tx beam #0 or Tx beam #1, the UE may inform the BS of the index of a Tx beam actually used for the transmission by changing the sequence of the initial signal.

In the above-described UL initial signal transmission and reception methods, the BS may indicate the indices of UE Tx beams associated with SRS resources through an SRS resource indicator (SRI) in the UL grant in order to inform the UE of UE Tx beam candidates Additionally, the initial signal applicable to the present disclosure may be defined by multiplexing of multiple UL DM-RSs (or SRSs) in the time and/or frequency domain after applying the above-described method to the UL DM-RSs (or SRSs).

4.2. PDCCH Monitoring Method

In this section, a description will be given of how a BS indicates a Tx beam and how a UE receives a PDCCH when an initial signal is defined based on a PDCCH DM-RS according to the DL initial signal transmission and reception method described in section 4.1.2.3. Further, a method by which a UE monitors a PDCCH in a DL Tx burst will be also described in detail.

When a BS and a UE transmit and receive a signal by forming an analog beam (and more particularly, in a mmWave band), if only one beam pair link is established between the BS and UE or if the link quality of the beam pair is degraded due to the following reasons: mobility, blockage, etc., it may be difficult to find a new beam pair link between the BS and UE. Accordingly, multiple beam pair links may be established between the BS and UE. In this case, even though the link equality of a beam pair link is degraded, another beam pair link with better quality may be generated.

It is assumed that up to N CORESETs (e.g., N=3) may be configured for each BWP in the NR system to which the present disclosure is applicable. In this case, the BS may configure QCL SSBs or RSs (e.g., CSI-RS) for the UE. In particular, as described above, when the BS and UE intends to establish multiple beam pair links therebetween, the BS may configure a different QCL relationship for each CORESET. In this case, which Tx beam is used by the BS to transmit a DL Tx burst (or which SSB or RS is QCL (or QCLed) with a CORESET for transmission thereof) may vary depending on CAP results. As a result, the UE may not understand which CORESET is transmitted at which time.

Alternatively, the BS may configure a search space set corresponding to a CORESET index. However, the UE may not anticipate which search space set is transmitted.

In this section, a described will be given of how a BS indicates a Tx beam and how a UE receives a PDCCH when DL initial signal transmission and reception are defined based on a PDCCH DM-RS as described in section 4.1.2.3, 4.2.1. DL Tx Beam Indication Method 4.2.1.1. First DL Tx Beam Indication Method It is assumed that CORESETs (or search space sets) corresponding to a plurality of Tx beams (or having different QCL relationships) in one slot (a TU or a symbol group) are time division multiplexed (TDMed) (and/or frequency division multiplexed (FDMed)). When an initial signal and/or a PDCCH is detected in a CORESET (or search space set) in a U-band, a UE may receive a DL data burst on an Rx beam corresponding to the CORESET (or by assuming that the UE receives a signal transmitted on a Tx beam QCL (or QCLed) with the corresponding CORESET). In this case, a BS may indicate only a CORESET (or search space set) corresponding to a Tx beam to be actually used for DL data burst transmission based on the success of a DL CAP among the TDMed (and/or FDMed) CORESETs (having the different QCL relationship). In other words, the UE may not perform PDCCH monitoring for CORESETs associated with other Tx beams except the Tx beam associated with the CORESET detected during the corresponding DL data burst transmission (in this case, information on the DL transmission duration of the corresponding DL data burst may be obtained from the initial signal or a specific PDCCH such as a group common PDCCH).

The operation in which the BS transmits a DL signal only on a Tx beam associated with a CORESET in a specific DL data burst or the operation in which the UE receives the DL signal based on the Tx beam associated with the CORESET in the specific DL data burst in response to the BS operation may be applied not only to the method proposed in section 4.2.1.1 but also the methods proposed in section 4.2.1.2 or 4.2.1.3.

4.2.1.2. Second DL Tx Beam Indication Method

It is assumed that one default beam (or CORESET(s) with one default QCL relationship) is configured/defined for a UE. In this case, the UE may receive a PDCCH on the default beam (or a beam applied to the CORESET(s) with the default QCL relationship) on most PDCCH monitoring occasions (or at slot boundaries). However, in a specific PDCCH monitoring occasion (or at a specific symbol boundary in a slot), the UE may receive the PDCCH on another configured beam (or receive a CORESET with another QCL relationship).

Alternatively, the UE may receive a CORESET based on a predetermined slot-to-CORESET relationship. For example, when there are three CORESETs associated with three beams (or having different QCL relationships), the UE may configure an Rx beam (or receive the CORESET) based on the index of the start slot of a DL burst according to the following relationship: CORESET index=mod (slot index, 3). Here, a CORESET may be replaced with a search space set associated with the CORESET.

4.2.1.3. Third DL Tx Beam Indication Method

It is assumed that CORESETs (or search space sets) corresponding to a plurality of Tx beams (or having different QCL relationships) in one slot (a TU or a symbol group) are TDMed (and/or FDMed). When an initial signal and/or a PDCCH is detected in a CORESET (or search space set) in a U-band, if the initial signal and/or PDCCH in the corresponding CORESET contains information indicating that a Tx beam applied to the CORESET is identical to a Tx beam applied to a data burst, a UE may receive the DL data burst on an Rx beam corresponding to the CORESET (or on the assumption that a signal transmitted on a Tx beam QCL (or QCLed) with the corresponding CORESET is received). In other words, when the initial signal and/or PDCCH in the corresponding CORESET does not contain the information indicating that the Tx beam applied to the CORESET is identical to the Tx beam applied to the data burst, the UE may not attempt to receive the data burst on the beam associated with the corresponding CORESET although the initial signal and/or PDCCH is included in the CORESET detected by the UE.

A BS may transmit the initial signal and/or PDCCH not only for a CORESET corresponding to a Tx beam to be actually used for DL data burst transmission based on the success of a DL CAP among the TDMed (and/or FDMed) CORESETs (having the different QCL relationship) but also for all (or some) TDMed CORESETs. In this case, depending on whether the Tx beam applied to the initial signal and/or PDCCH is identical to the Tx beam applied to the DL data burst, the BS may include different information in the sequence of the initial signal and/or the PDCCH. If the UE recognizes, from the information included in the sequence of the initial signal and/or the PDCCH, that the Tx beam applied to the initial signal and/or PDCCH is different from the Tx beam applied to the data burst, the UE may expect that no data burst will be transmitted on the corresponding Tx beam (or all Tx beams available for a predetermined time) for the predetermined time (e.g., during one slot or until the boundary of an end slot). Here, a CORESET may be replaced with a search space set associated with the CORESET.

In the above-described beam indication methods, a CORESET may refer to a CORESET (or search space set) in which a group common PDCCH including SFI information is transmitted. In other words, in the beam indication methods, a PDCCH may refer to a group common PDCCH including SFI information.

The beam indication methods may be equally applied not only to the initial signal based on the PDCCH DM-RS described in section 4.1.2.3 but also to other DL initial signals. For example, when signals obtained by modifying a PSS/SSS/PBCH-DM-RS are defined as initial signals as described in section 4.1.2.1 or 4.1.2.2 and when the index of a slot/symbol in which the corresponding signals are transmitted through TDM (or FDM) is predefined, a BS may inform a UE of the index of a beam used for a burst by transmitting some or all of the initial signals.

4.2.2. PDCCH Monitoring Method

Hereinafter, a description will be given of a method by which a UE receives (or monitors) a PDCCH based on the above-described various methods.

4.2.2.1. First PDCCH Monitoring Method

If a UE recognize the start of a DL burst while performing PDCCH monitoring in a U-band at a default periodicity (or at a PDCCH periodicity configured in a default search space set), the UE may perform the PDCCH monitoring on a slot basis (or at a PDCCH periodicity configured in a search space set configured to be transmitted in the DL burst) from a next slot (or after k slots) (in the DL burst).

Here, the default periodicity may be shorter than one slot duration and indicated/configured by L1 signaling or RRC signaling.

Figure 18:
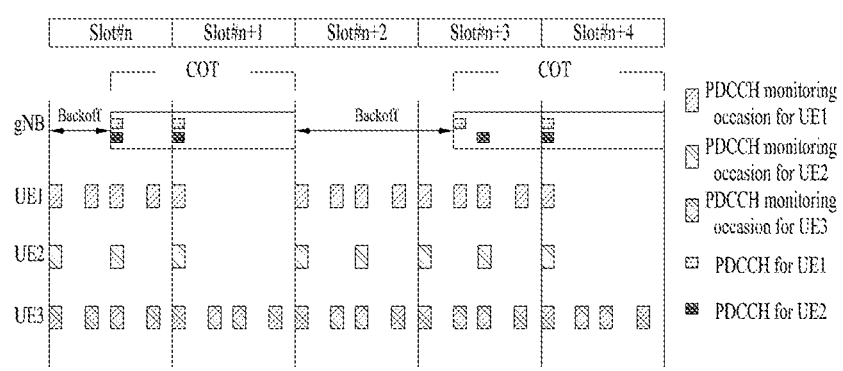
FIG. 18 is a diagram schematically illustrating a PDCCH monitoring operation for a UE applicable to the present disclosure.

FIG. 18 is a diagram schematically illustrating a PDCCH monitoring operation for a UE applicable to the present disclosure.

As illustrated in FIG. 18, UE 1 may be configured to perform PDCCH monitoring four times in one slot. Upon recognizing that a data burst starts in slot #n (and slot #n+3), UE 1 may perform the PDCCH monitoring on a slot basis from slot #n+1 (unlike the configuration).

UE 2 may be configured to perform the PDCCH monitoring two times in one slot. Upon recognizing that the data burst starts in slot #n (and slot #n+3), UE 2 may perform the PDCCH monitoring on the slot basis from slot #n+1 (unlike the configuration).

UE 3 may be configured to perform the PDCCH monitoring four times in one slot as in UE 1. However, it is assumed that UE 3 fails to recognize that a BS starts the data burst, as opposed to UE 1 and UE 2. In this case, since UE 3 does not recognize that the BS starts the data burst, UE 3 may continue to perform the PDCCH monitoring at a periodicity shorter than one slot.

UE 1 to UE 3 may recognize the start of a data burst based on an initial signal from the BS in the same way as described above or according to other methods.

According to the present disclosure, since a UE is capable of performing PDCCH decoding only at slot boundaries within a data burst (or COT) upon recognizing the burst, the UE may have advantages in terms of power saving and spectral efficiency due to DCI overhead reduction in a slot/mini-slot.

4.2.2.2. Second PDCCH Monitoring Method

A BS may indicate/configure the periodicity of PDCCH monitoring to be performed in a Tx burst or the configuration of a search space set to/for a UE over a PDCCH (e.g., a group common PDCCH containing SFI information).

For example, referring to FIG. 18, the BS may transmit a PDCCH to one or more UEs in slot #n in order to indicate/configure the periodicity of PDCCH monitoring to be performed in slot #n+1 to/for the UEs receiving the PDCCH.

Alternatively, when the UE receives a PDCCH containing information on a search space set while performing the PDCCH monitoring at the default periodicity (or the PDCCH periodicity configured in the default search space set), the UE may perform the PDCCH monitoring based on a PDCCH periodicity/offset configured in the corresponding search space set (from a slot in which the corresponding PDCCH is transmitted or after K slot(s) from the slot in which the corresponding PDCCH is transmitted).

In the above-described first PDCCH monitoring method, a UE may fail to detect/decode a PDCCH and/or an initial signal that indicates the start of a Tx burst. However, to allow such a UE to perform PDCCH detection at slot boundaries at least in a next slot (or in a slot after next k slots), PDCCH candidates of a CORESET for the PDCCH monitoring in each slot (or at each slot boundary) may have a relationship of inclusion with PDCCH candidates of a CORESET for the PDCCH monitoring at the default periodicity. For example, the PDCCH candidates of the CORESET for the PDCCH monitoring in each slot (or at each slot boundary) may be configured to include PDCCH candidates (at least) at slot boundaries among the PDCCH candidates of the CORESET for the PDCCH monitoring at the default periodicity. On the contrary, the PDCCH candidates (at least) at the slot boundaries among the PDCCH candidates of the CORESET for the PDCCH monitoring at the default periodicity may be configured to include the PDCCH candidates of the CORESET for the PDCCH monitoring in each slot (or at each slot boundary). Alternatively, the PDCCH candidates of the CORESET for the PDCCH monitoring in each slot (or at each slot boundary) and the PDCCH candidates (at least) at the slot boundaries among the PDCCH candidates of the CORESET for the PDCCH monitoring at the default periodicity may be configured to partially overlap with each other.

Similarly, in the above-described first PDCCH monitoring method, a UE may fail to detect/decode a PDCCH that indicates/configures a PDCCH monitoring periodicity or a search space configuration. However, to allow such a UE to perform PDCCH detection at slot boundaries at least in a next slot (or in next k slots), PDCCH candidates of a CORESET for the PDCCH monitoring in each slot (or at each slot boundary) may have a relationship of inclusion with PDCCH candidates (at least) at slot boundaries among PDCCH candidates of a CORESET for the PDCCH monitoring at the periodicity shorter than the slot. For example, the PDCCH candidates of the CORESET for the PDCCH monitoring in each slot (or at each slot boundary) may be configured to include the PDCCH candidates (at least) at the slot boundaries among the PDCCH candidates of the CORESET for the PDCCH monitoring at the periodicity shorter than the slot. On the contrary, the PDCCH candidates (at least) at the slot boundaries among the PDCCH candidates of the CORESET for the PDCCH monitoring at the periodicity shorter than the slot may be configured to include the PDCCH candidates of the CORESET for the PDCCH monitoring in each slot (or at each slot boundary). Alternatively, the PDCCH candidates of the CORESET for the PDCCH monitoring in each slot (or at each slot boundary) and the PDCCH candidates (at least) at the slot boundaries among the PDCCH candidates of the CORESET for the PDCCH monitoring at the periodicity shorter than the slot may be configured to partially overlap with each other.

4.3. Embodiment Applicable to Present Disclosure

Figure 19:
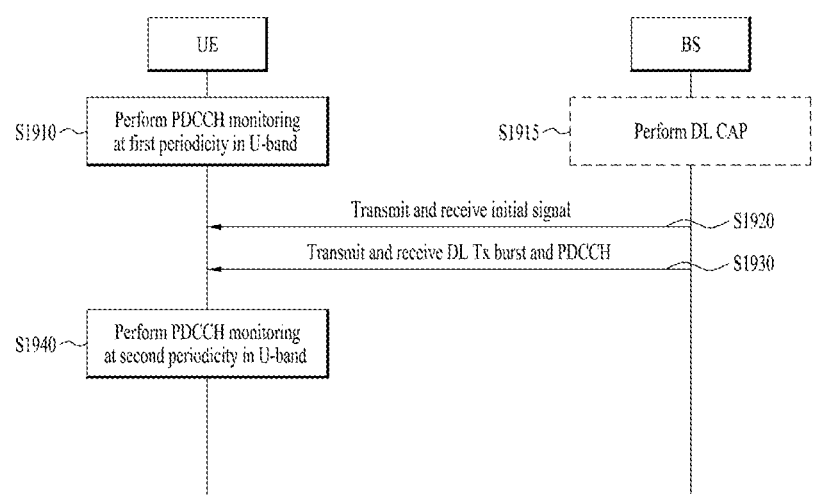
FIG. 19 is a diagram illustrating a signal transmission and reception method for a UE and a BS in a unlicensed band applicable to the present disclosure.
Figure 20:
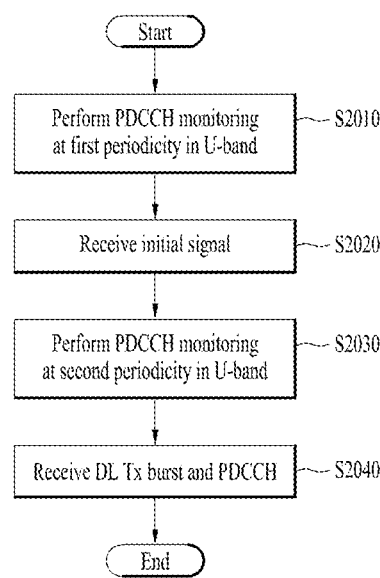
FIG. 20 is a flowchart illustrating a method for the UE to receive a downlink signal in the unlicensed band applicable to the present disclosure.
Figure 21:
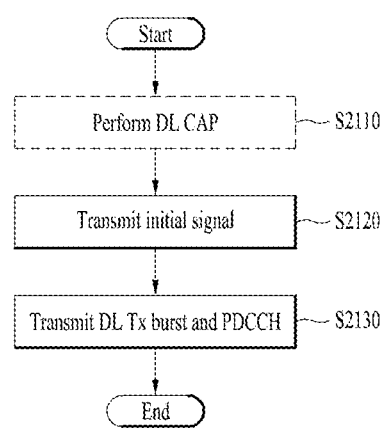
FIG. 21 is a flowchart illustrating a method for the BS to transmit the downlink signal in the unlicensed band applicable to the present disclosure.

FIG. 19 is a diagram illustrating a signal transmission and reception method for a UE and a BS in a U-band applicable to the present disclosure, FIG. 20 is a flowchart illustrating a method for the UE to receive a DL signal in the U-band applicable to the present disclosure, and FIG. 21 is a flowchart illustrating a method for the BS to transmit the DL signal in the U-band applicable to the present disclosure.

According to the present disclosure, the UE may receive the DL signal by performing first PDCCH monitoring at a first periodicity in the U-band (S1910 and S2010).

In this case, the BS may perform a CAP for transmitting the DL signal in the U-band (S1915 and S2110). In the present disclosure, step S1910 and S1915 may be performed sequentially or simultaneously.

The BS transmits an initial signal based on the DL CAP (S1920 and S2120). Specifically, when the BS determines from the DL CAP that the U-band is idle, the BS may transmit the initial signal to the UE in the U-band.

The UE receives the initial signal from the BS in the U-band (S1920 and S2020).

The BS transmits a DL Tx burst related to the initial signal and a PDCCH to the UE in the U-band (S1930 and S2130). The PDCCH included in the DL Tx burst may be transmitted to the UE at a predetermined periodicity during the transmission of the DL Tx burst.

The UE performs second PDCCH monitoring at a second periodicity, which is different from the first periodicity, in the U-band (S1940 and S2030). The UE performs the second PDCCH monitoring from a slot after N slots with respect to a slot in which the initial signal is received during the transmission of the DL Tx burst.

Although FIG. 19 illustrates the initial signal transmission and the DL Tx burst and PDCCH transmission at the BS as different steps, the initial signal transmission and the DL Tx burst and PDCCH transmission may be performed simultaneously or sequentially. In addition, the PDCCH monitoring at the UE, which is performed at the second periodicity in the U-band, and the DL Tx burst and PDCCH transmission at the BS in the U-band may be performed at the same time. Alternatively, the operations may be performed in the reverse order to that shown in FIG. 19.

By operating as described above, the BS and UE may transmit and receive the PDCCH at the second periodicity while the BS transmit the DL Tx burst as shown in FIG. 18, thereby reducing the complexity of the PDCCH monitoring at the UE and the battery consumption thereof.

In the present disclosure, the second periodicity may correspond to one slot duration.

For example, the second PDCCH monitoring based on the second periodicity may include monitoring the PDCCH at the second periodicity at a slot boundary at which each slot starts.

The first periodicity may be set shorter than the second periodicity. In this case, the first periodicity may be indicated or configured by physical layer signaling or higher layer signaling. Thus, after receiving the initial signal, the UE may perform the PDCCH monitoring at a periodicity longer than the previous one.

In the present disclosure, first PDCCH candidates for the first PDCCH monitoring based on the first periodicity at the slot boundary at which each slot starts may have a relationship of inclusion with second PDCCH candidates for the second PDCCH monitoring based on the second periodicity. For example, the first PDCCH candidates may include the second PDCCH candidates and vice versa.

In the present disclosure, the initial signal may be one of the following:

- an SS modified for extension in the frequency domain;
- a DM-RS for a PBCH modified for the extension in the frequency domain;
- a DM-RS for the PDCCH;
- a group common PDCCH;
- a cell-specific CSI-RS; and
- a CP for some symbols of the DL Tx burst or a part of the CP.

Here, the group common PDCCH may correspond to a PDCCH including slot format indicator (SFI) information.

Thus, upon receiving the group common PDCCH as the initial signal, the UE may perform the following steps: detecting a DM-RS for the group common PDCCH; decoding the group common PDCCH based on the DM-RS; and obtaining the presence of the DL Tx burst from the BS by checking whether the CRC result for the group common PDCCH is successful.

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE through a predefined signal (e.g., a physical layer signal, a higher layer signal, etc.).

5. DEVICE CONFIGURATION

Figure 22:
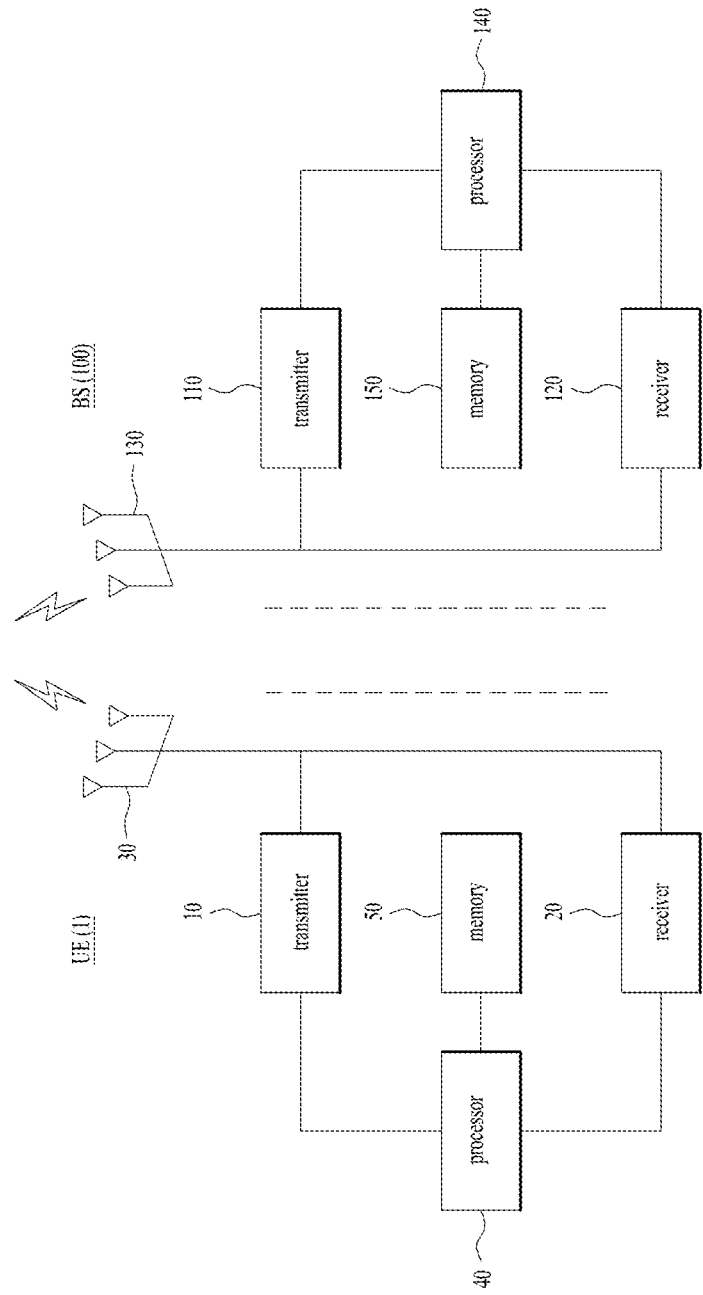
FIG. 22 is a block diagram illustrating the configurations of a UE and a BS for implementing the proposed embodiments.

FIG. 22 is a block diagram illustrating the configurations of a UE and a BS for implementing the proposed embodiments. The UE and the BS illustrated in FIG. 22 operate to implement the embodiments of the afore-described method of transmitting and receiving a signal in a U-band.

A UE 1 may act as a transmission end on a UL and as a reception end on a DL. A BS (eNB or gNB) 100 may act as a reception end on a UL and as a transmission end on a DL.

That is, each of the UE and the BS may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Further, each of the UE and the BS includes a processor 40 or 140 for implementing the afore-described embodiments of the present disclosure. The processor 40 or 140 may be configured to perform the foregoing described/proposed procedures and/or methods by controlling the memory 50 or 150 and/or the Tx 10 or 110 and/or the Rx 20 or 120.

For example, the processor 40 or 140 includes a communication modem designed to implement wireless communication technologies (e.g., LTE and NR). The memory 50 or 150 is coupled to the processor 40 or 140, and stores various types of information related to operations of the processor 40 or 140. For example, the memory 50 or 150 may store software code including instructions for performing all or part of processes controlled by the processor 40 or 140 or the afore-described/proposed procedures and/or methods. The Tx 10 or 110 and/or the Rx 20 or 120 is coupled to the processor 40 or 140 and transmits and/or receives a wireless signal. The processor 40 or 140 and the memory 50 or 150 may be part of a processing chip (e.g., system on chip (SoC)).

A processor of a communication device for transmitting or receiving a DL signal according to the present disclosure may operate as follows by controlling a memory.

The processor of the communication device for receiving the DL signal from the BS in a U-band may be configured to: receive the DL signal by performing first PDCCH monitoring at a first periodicity in the U-band; receive an initial signal indicating the presence of a DL Tx burst from the BS in the U-band; and receive the DL signal by performing second PDCCH monitoring at a second periodicity, which is different from the first periodicity, in the U-band, wherein the second PDCCH monitoring is performed from a slot after N slots with respect to a slot in which the initial signal is received during transmission of the DL Tx burst.

The UE 1 including the communication device may be configured to control the processor 40 and the Rx 20 to receive the DL signal by performing the first PDCCH monitoring at the first periodicity in the U-band; receive the initial signal indicating the presence of the DL Tx burst from the BS in the U-band; and receive the DL signal by performing the second PDCCH monitoring at the second periodicity, which is different from the first periodicity, in the U-band, wherein the second PDCCH monitoring is performed from the slot after the N slots with respect to the slot in which the initial signal is received during the transmission of the DL Tx burst.

The processor of the communication device for transmitting the DL signal to the UE in the U-band may be configured to: perform a CAP for transmitting the DL signal in the U-band; and transmit the initial signal and the DL Tx burst including a PDCCH in the U-band based on the CAP. The PDCCH included in the DL Tx burst may be transmitted to the UE at a predetermined periodicity during the transmission of the DL Tx burst.

The BS 100 including the communication device may be configured to control the processor 140, the Tx 110, and the Rx 120 to perform the CAP for transmitting the DL signal in the U-band; and transmit the initial signal and the DL Tx burst including the PDCCH in the U-band based on the CAP. The PDCCH included in the DL Tx burst may be transmitted to the UE at the predetermined periodicity during the transmission of the DL Tx burst.

The Tx and Rx of the UE and the BS may perform packet modulation/demodulation for data transmission, high-speed packet channel coding, OFDM packet scheduling, TDD packet scheduling, and/or channel multiplexing. Each of the UE and the BS of FIG. 22 may further include a low-power radio frequency/intermediate frequency (RF/IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method performed by a user equipment (UE) in a wireless communication system, the method comprising:
   monitoring a first search space set on a cell;
   receiving, at a first time unit, a Physical Downlink Control Channel (PDCCH) including information related to a second search space set for the cell; and
   starting, from a second time unit, monitoring of the second search space set based on the information in the PDCCH,
   wherein the second search space set is different from the first search space set, and
   wherein the second time unit is after a plurality of time units from the first time unit.

2. The method of claim 1, wherein the PDCCH includes a slot format indicator (SFI).

3. The method of claim 1, wherein the information is related to a switching of a search space set in which monitoring is performed from the first search space set to the second search space set.

4. The method of claim 1, wherein the monitoring of the first search space set is stopped from the second time unit.

5. The method of claim 1, wherein the monitoring of the first search space set is performed in a first periodicity, and wherein the monitoring of the second search space set is performed in a second periodicity.

6. The method of claim 5, wherein the first periodicity is different from the second periodicity.

7. A communication device configured to operate in a wireless communication system, the communication device comprising:
   at least one processor; and
   at least one computer memory operably connectable to the at least one processor and storing instructions that, when executed, cause the at least one processor to perform operations comprising:
   monitoring a first search space set on a cell;
   receiving, at a first time unit, a Physical Downlink Control Channel (PDCCH) including information related to a second search space set for the cell; and starting, from a second time unit, monitoring of the second search space set based on the information in the PDCCH, wherein the second search space set is different from the first search space set, and wherein the second time unit is after a plurality of time units from the first time unit.

8. The communication device of claim 7, wherein the PDCCH includes a slot format indicator (SFI).

9. The communication device of claim 7, wherein the information is related to a switching of a search space set in which monitoring is performed from the first search space set to the second search space set.

10. The communication device of claim 7, wherein the monitoring of the first search space set is stopped from the second time unit.

11. The communication device of claim 7, wherein the monitoring of the first search space set is performed in a first periodicity, and wherein the monitoring of the second search space set is performed in a second periodicity.

12. The communication device of claim 11, wherein the first periodicity is different from the second periodicity.

13. The communication device of claim 7, wherein the communication device is a part of an autonomous driving device that communicates with at least a network or another autonomous device.

* * * * *